United States Patent
Kelly et al.

(10) Patent No.: US 12,445,414 B2
(45) Date of Patent: Oct. 14, 2025

(54) SECURITY-BASED ARTIFICIAL INTELLIGENCE WORKLOAD ALLOCATION IN A HETEROGENEOUS ENVIRONMENT

(71) Applicant: Dell Products L.P., Round Rock, TX (US)

(72) Inventors: John Kelly, Cork (IE); Balasubramanian Chandrasekaran, Austin, TX (US); Dharmesh M. Patel, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 149 days.

(21) Appl. No.: 18/419,771

(22) Filed: Jan. 23, 2024

(65) Prior Publication Data
US 2025/0240276 A1    Jul. 24, 2025

(51) Int. Cl.
*H04L 29/06* (2006.01)
*G06F 18/2415* (2023.01)
*H04L 9/40* (2022.01)

(52) U.S. Cl.
CPC ...... *H04L 63/0272* (2013.01); *G06F 18/2415* (2023.01)

(58) Field of Classification Search
CPC . H04L 63/0272; H04L 63/20; H04L 63/0245; H04L 63/0263; G06F 18/1425
See application file for complete search history.

(56) References Cited

U.S. PATENT DOCUMENTS

| | | | |
|---|---|---|---|
| 11,941,378 B1 * | 3/2024 | Adler | G06F 8/35 |
| 2019/0220601 A1 | 7/2019 | Sood et al. | |
| 2022/0114014 A1 | 4/2022 | Chen et al. | |
| 2022/0222584 A1 * | 7/2022 | Nimmagadda | G06N 20/00 |
| 2024/0419493 A1 * | 12/2024 | Ramanujan | G06F 9/5027 |

OTHER PUBLICATIONS

Unknown, Combined Search and Examination Report under Section 17 and 18(3) for 2500164.5, Combined Search and Examination Report under Section 17 and 18(3) for 2500164.5, unknown, pp. 1-6, unknown.

* cited by examiner

*Primary Examiner* — Longbit Chai
(74) *Attorney, Agent, or Firm* — Chamberlain, Hrdlicka, White, Williams & Aughtry; Aly Z. Dossa

(57) ABSTRACT

A method for managing selection of an inferencing workload placement based on security considerations includes obtaining, by a variant selection agent of a workload placement service and from a front-end device, a request for an inferencing payload associated with an inferencing workload implementing a generative artificial intelligence (AI) model, and in response to the request: performing a payload classification on the request to determine a variant selection for the inferencing workload, making a determination that the variant selection is a secured variant, in response to the determination, transmitting the request to the secured variant, wherein the secured variant executes an instance of the inferencing workload on a secured production environment, obtaining, from the secured variant, the inferencing payload, and providing the inferencing payload to the front-end device.

17 Claims, 14 Drawing Sheets

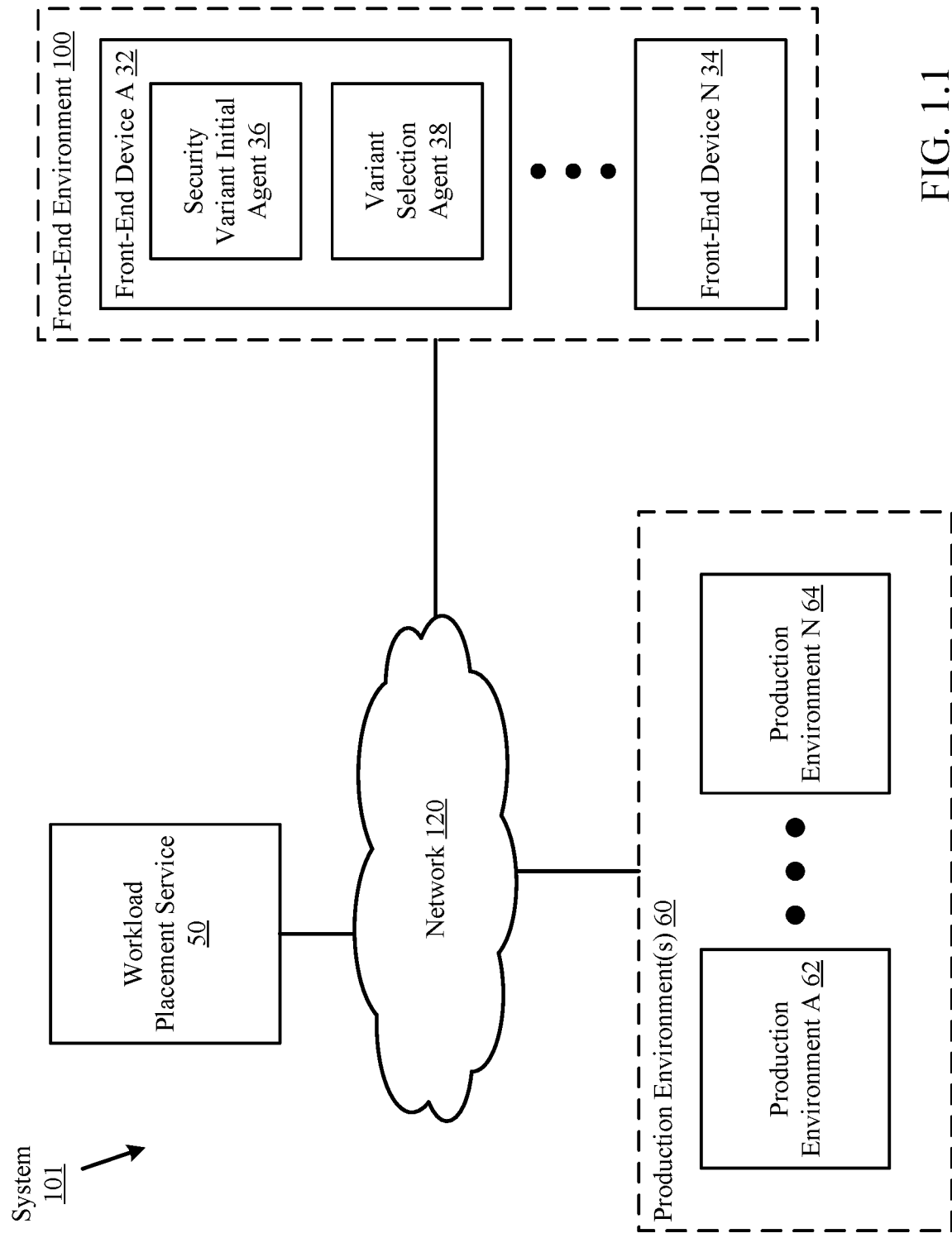
FIG. 1.1

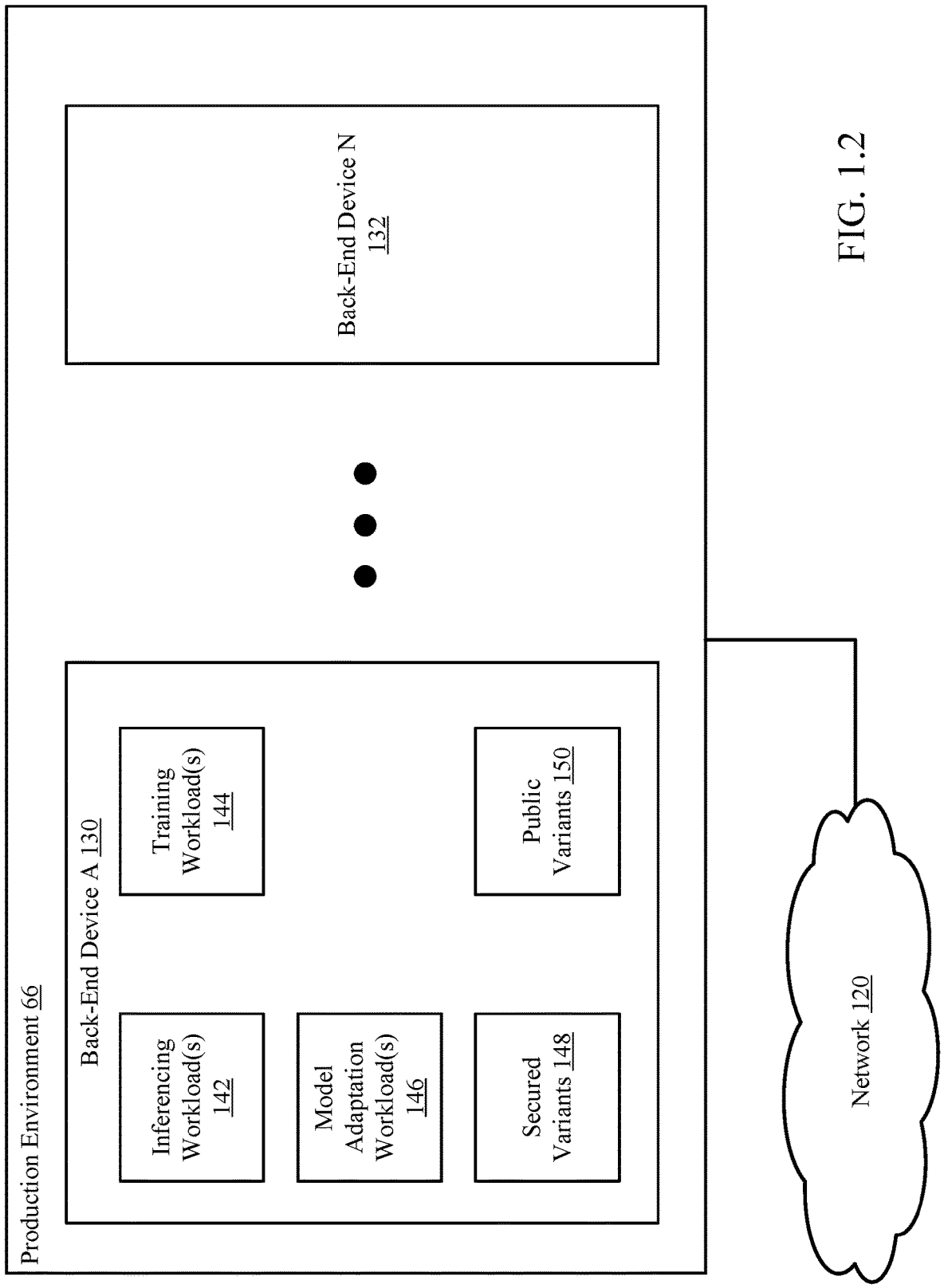
FIG. 1.2

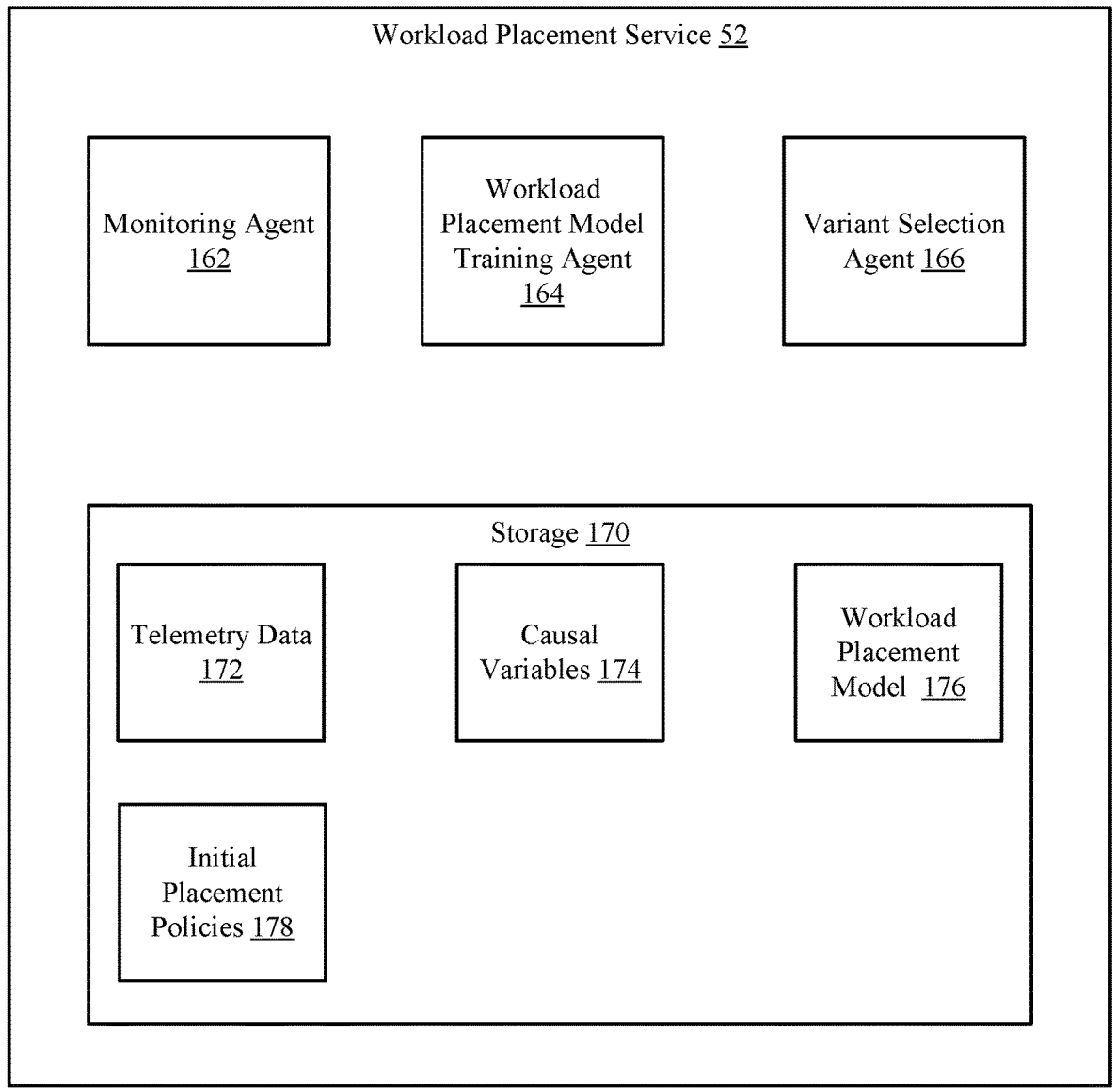
FIG. 1.3

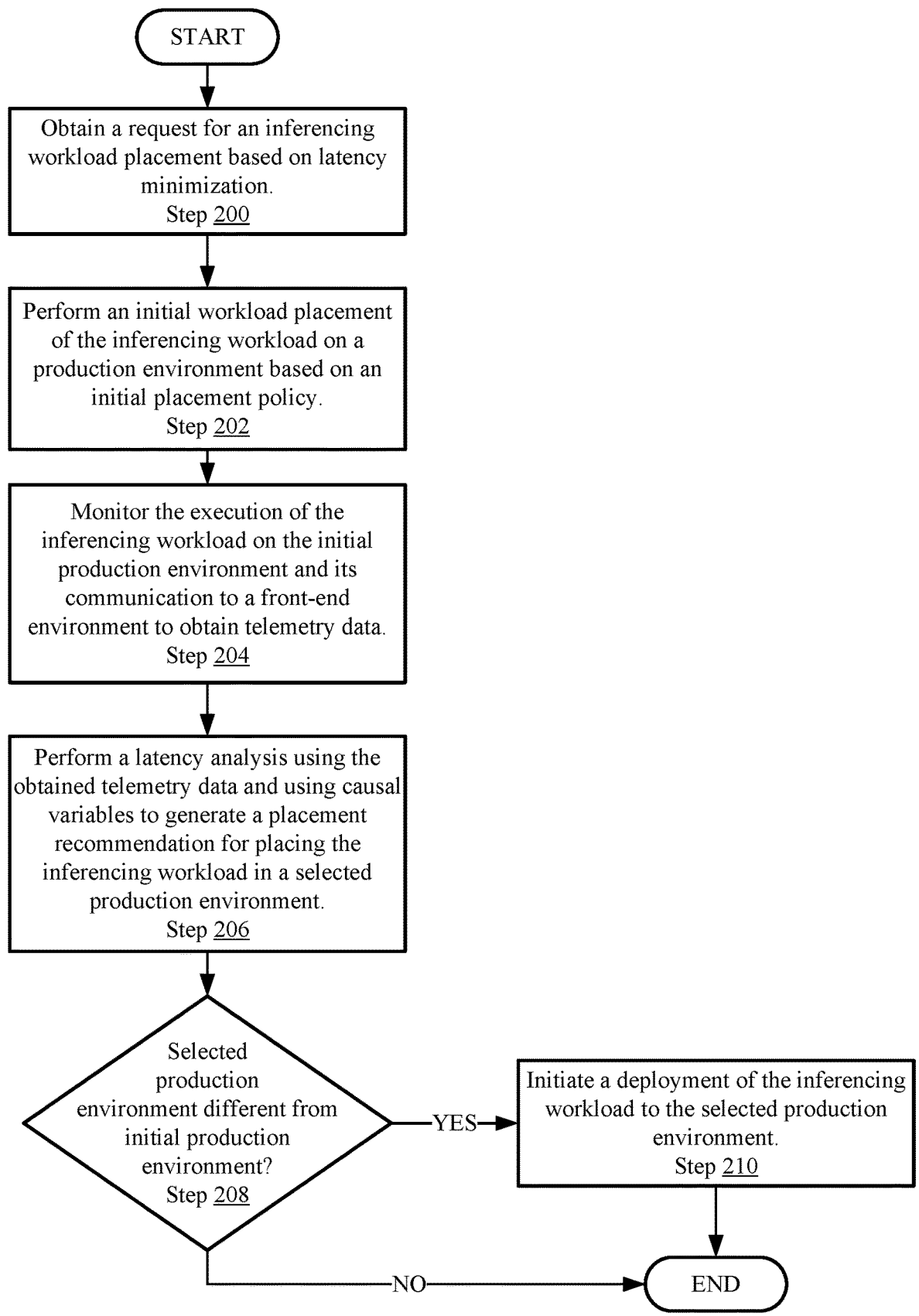
FIG. 2.1

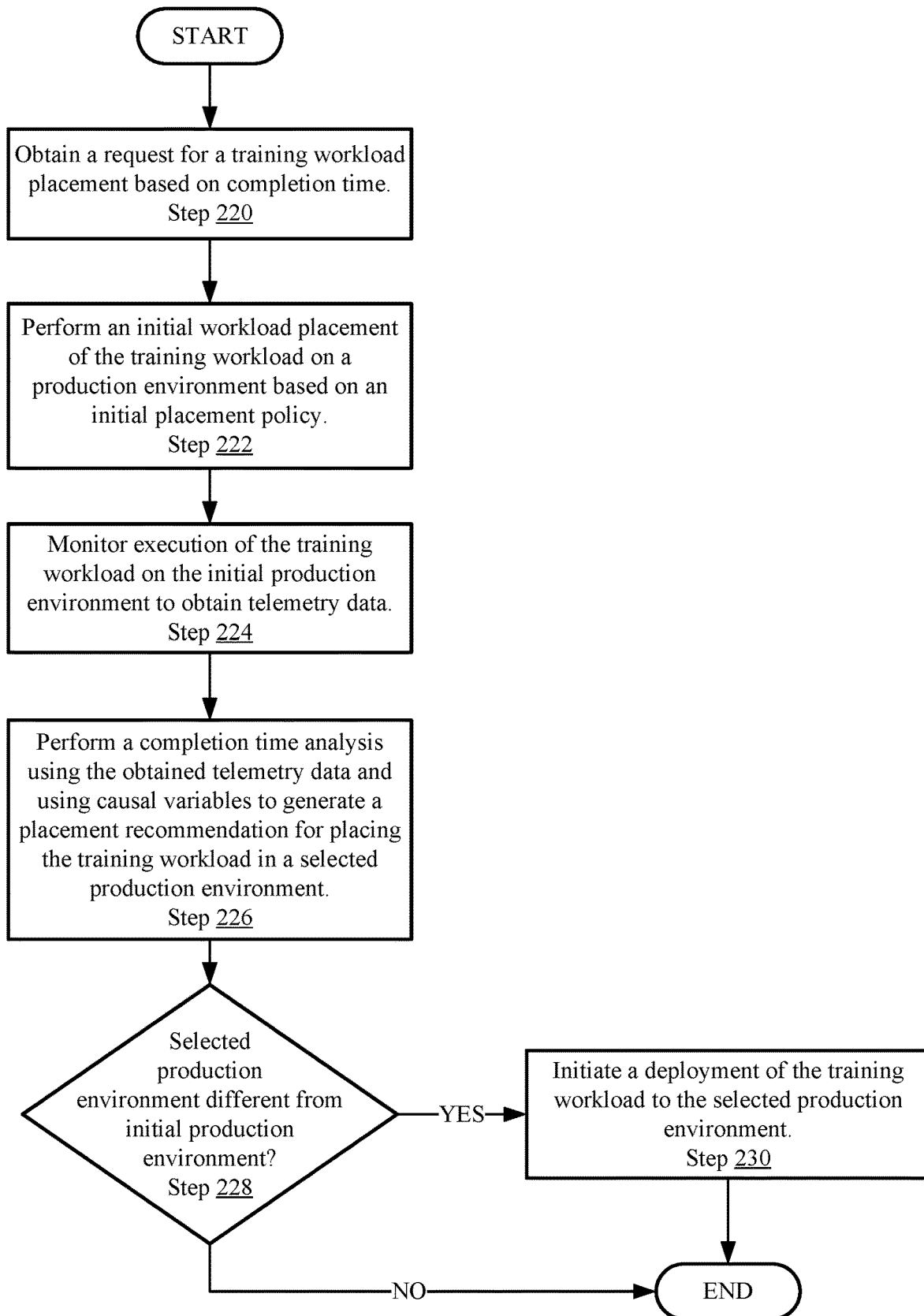
FIG. 2.2

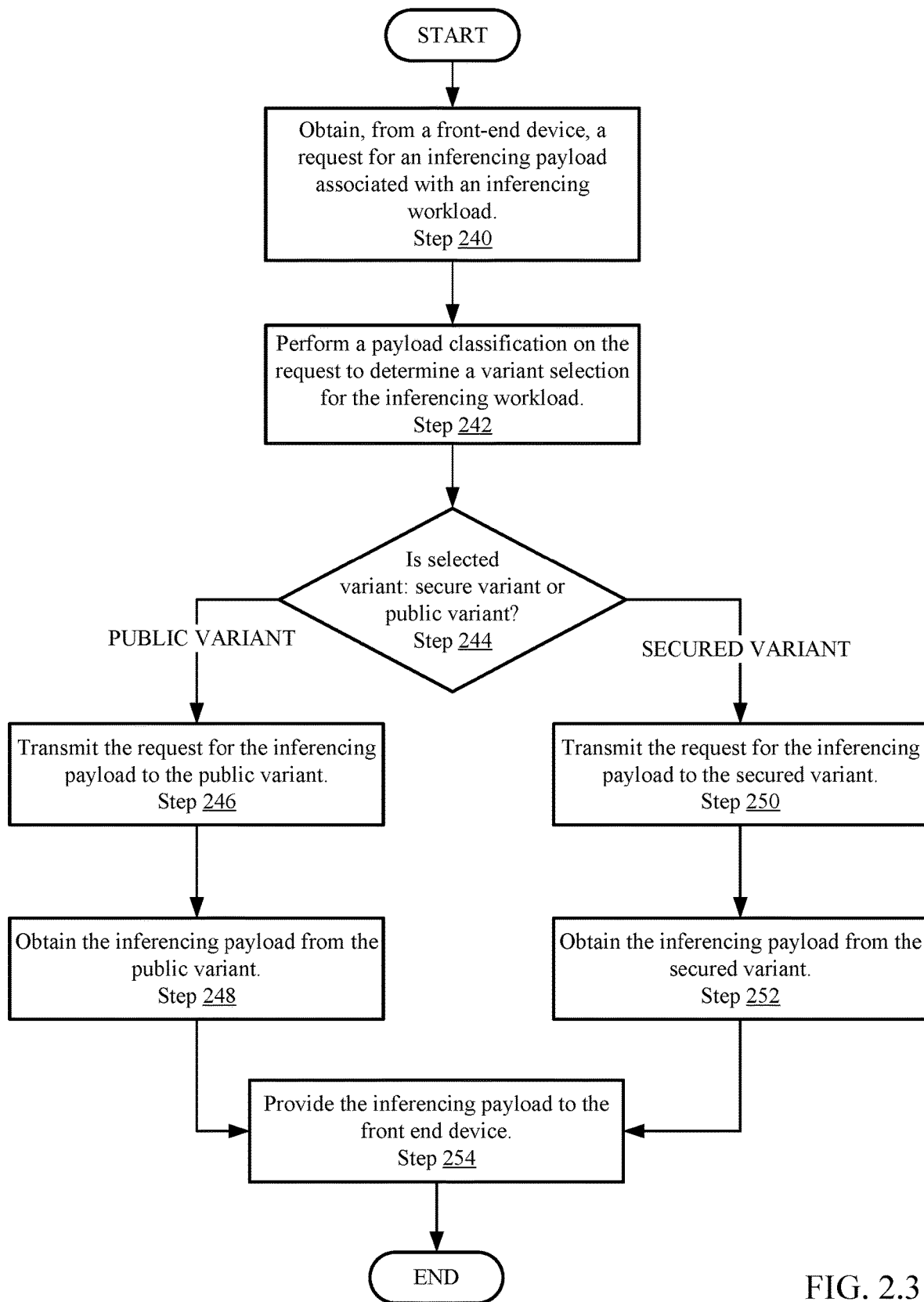
FIG. 2.3

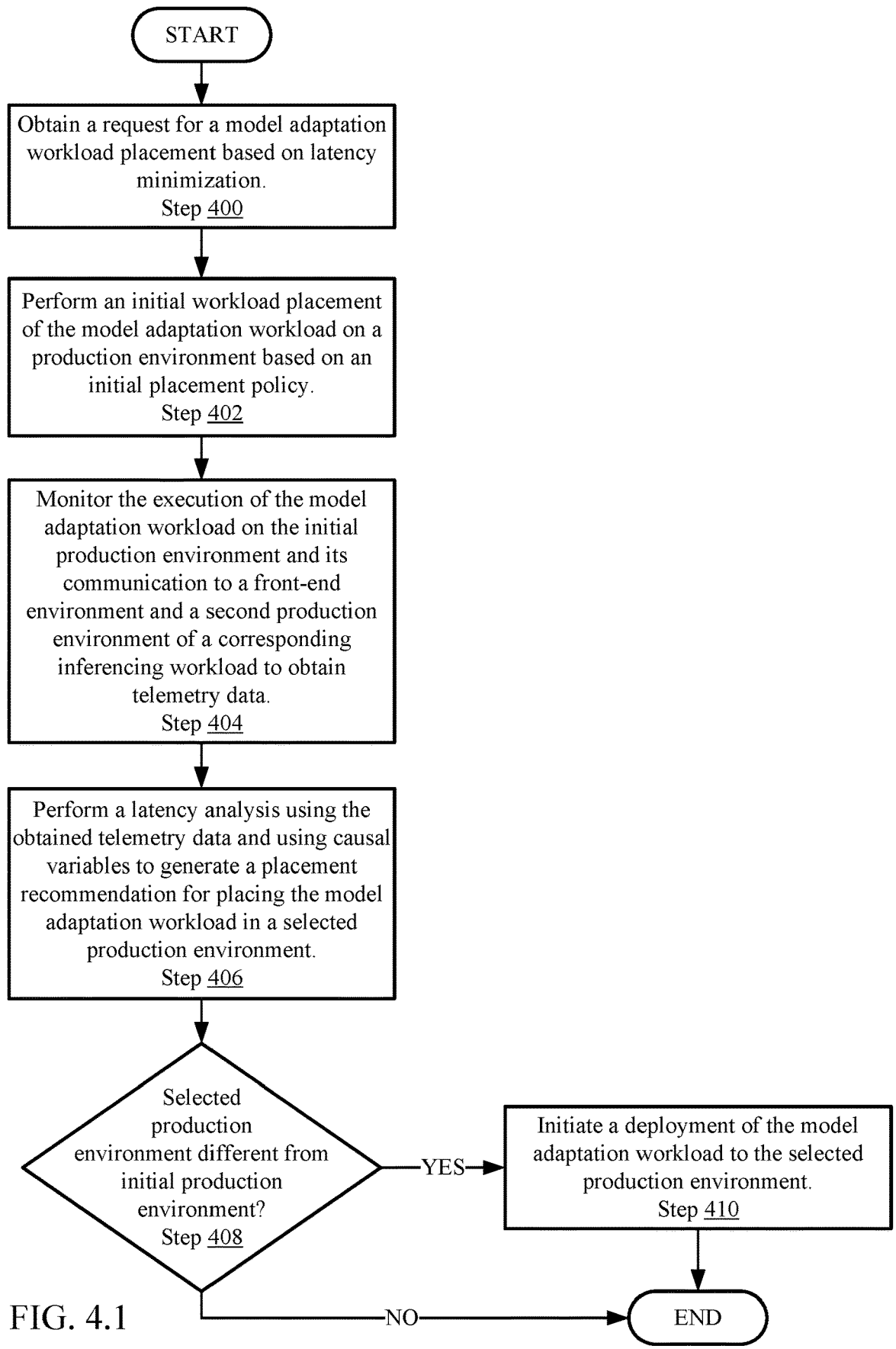
FIG. 4.1

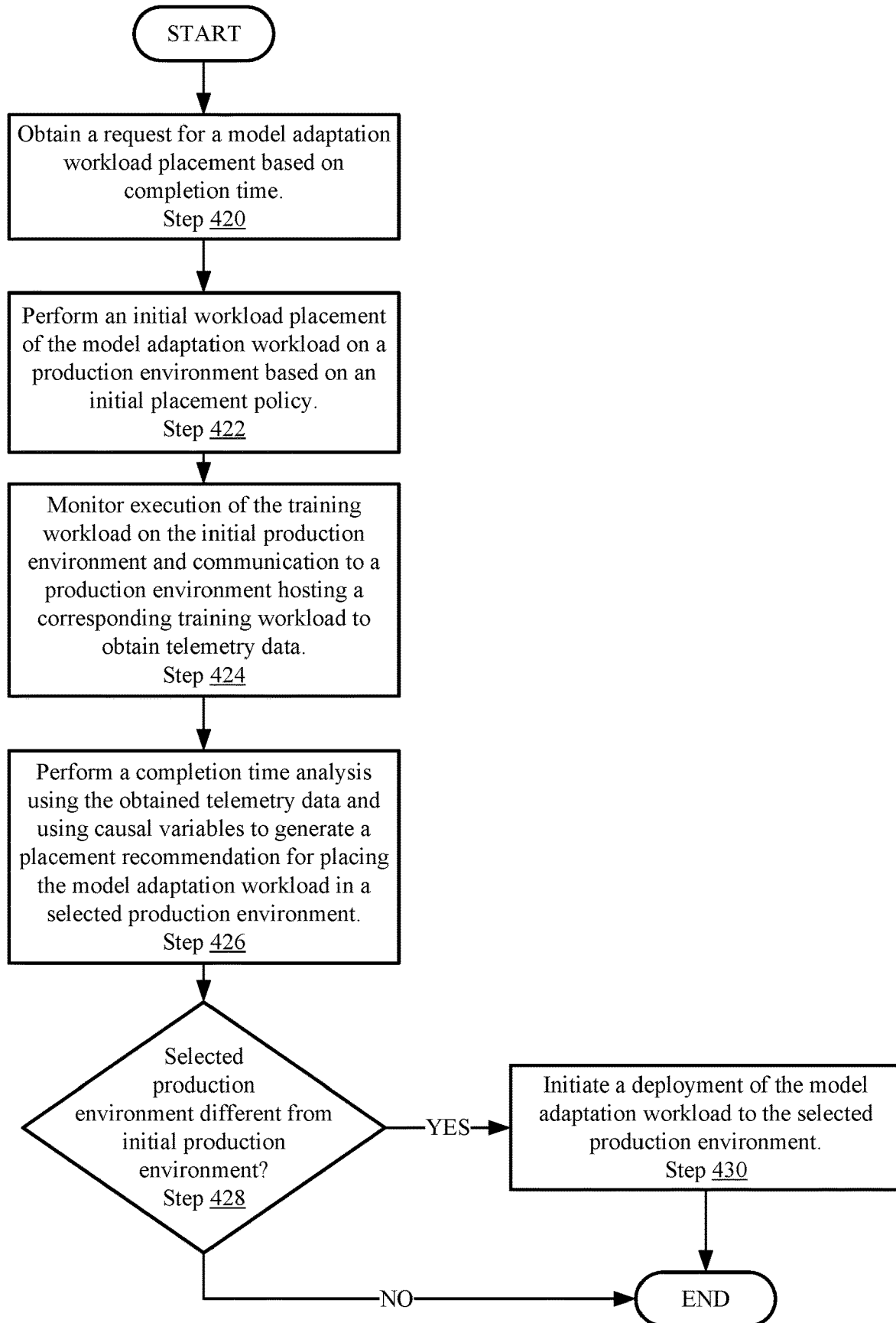
FIG. 4.2

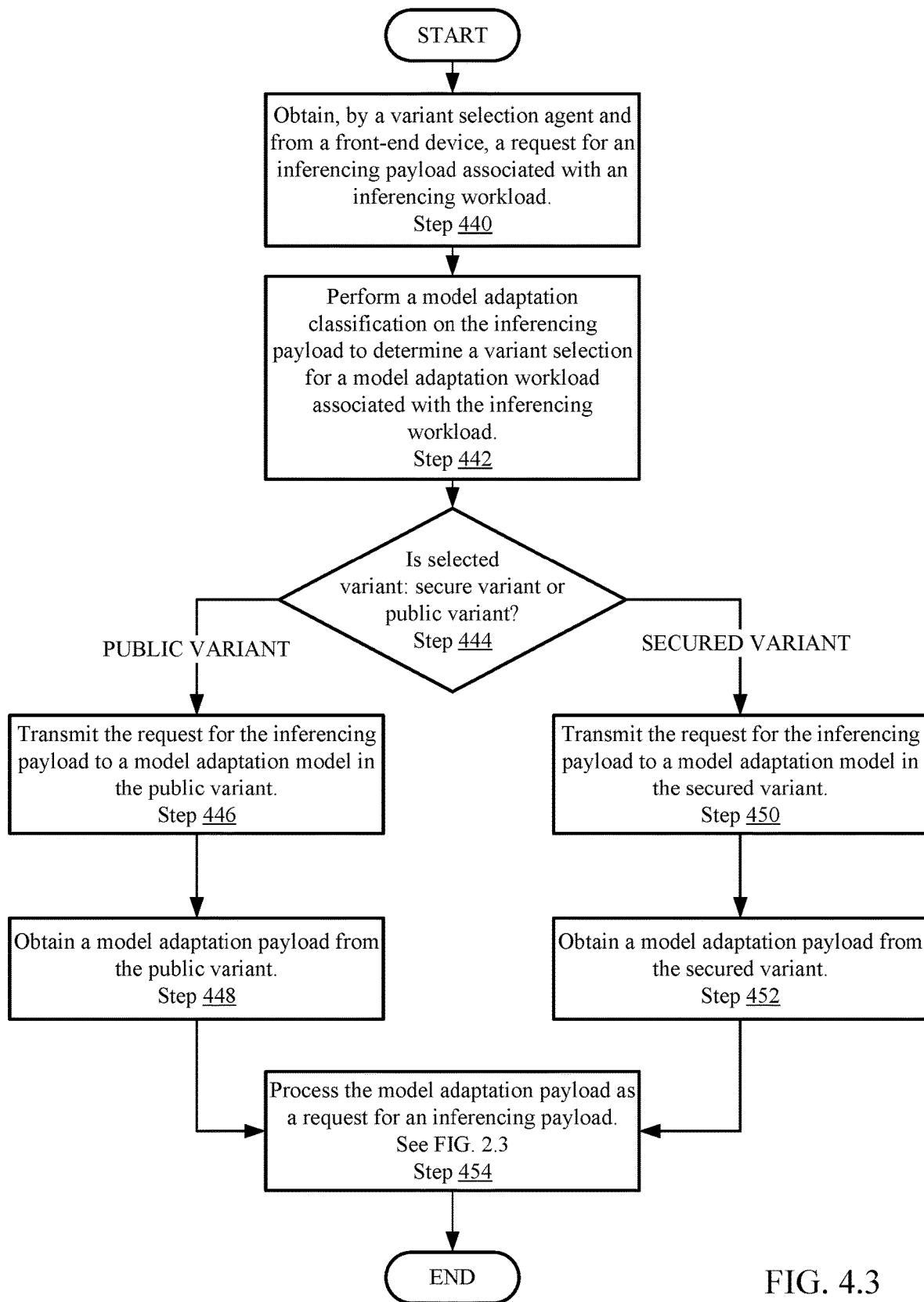
FIG. 4.3

SECURITY-BASED ARTIFICIAL INTELLIGENCE WORKLOAD ALLOCATION IN A HETEROGENEOUS ENVIRONMENT

BACKGROUND

Computing devices may provide services. To provide the services, the computing devices may include hardware components and software components. The software components may store information usable to provide the services using the hardware components. The services may include artificial intelligence (AI) workloads such as inferencing, training, and model adaptation. The assignment of these workloads to computing devices or other production environments may impact their performance and user experience.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1.1 shows a diagram of a system in accordance with one or more embodiments of the invention.

FIG. 1.2 shows a diagram of a production environment in accordance with one or more embodiments of the invention.

FIG. 1.3 shows a diagram of a workload placement service in accordance with one or more embodiments of the invention.

FIG. 2.1 shows a flowchart of a method of determining an inferencing workload placement based on latency minimization in accordance with one or more embodiments of the invention.

FIG. 2.2 shows a flowchart of a method of determining a training workload placement based on completion time in accordance with one or more embodiments of the invention.

FIG. 2.3 shows a flowchart of a method of a security-based inferencing workload placement in accordance with one or more embodiments of the invention.

FIG. 4.1 shows a flowchart of a method of determining a model adaptation workload placement based on latency minimization in accordance with one or more embodiments of the invention.

FIG. 4.2 shows a flowchart of a method of determining a model adaptation workload placement based on completion time in accordance with one or more embodiments of the invention.

FIG. 4.3 shows a flowchart of a method of a security-based model adaptation workload placement in accordance with one or more embodiments of the invention.

DETAILED DESCRIPTION

Figure 3:
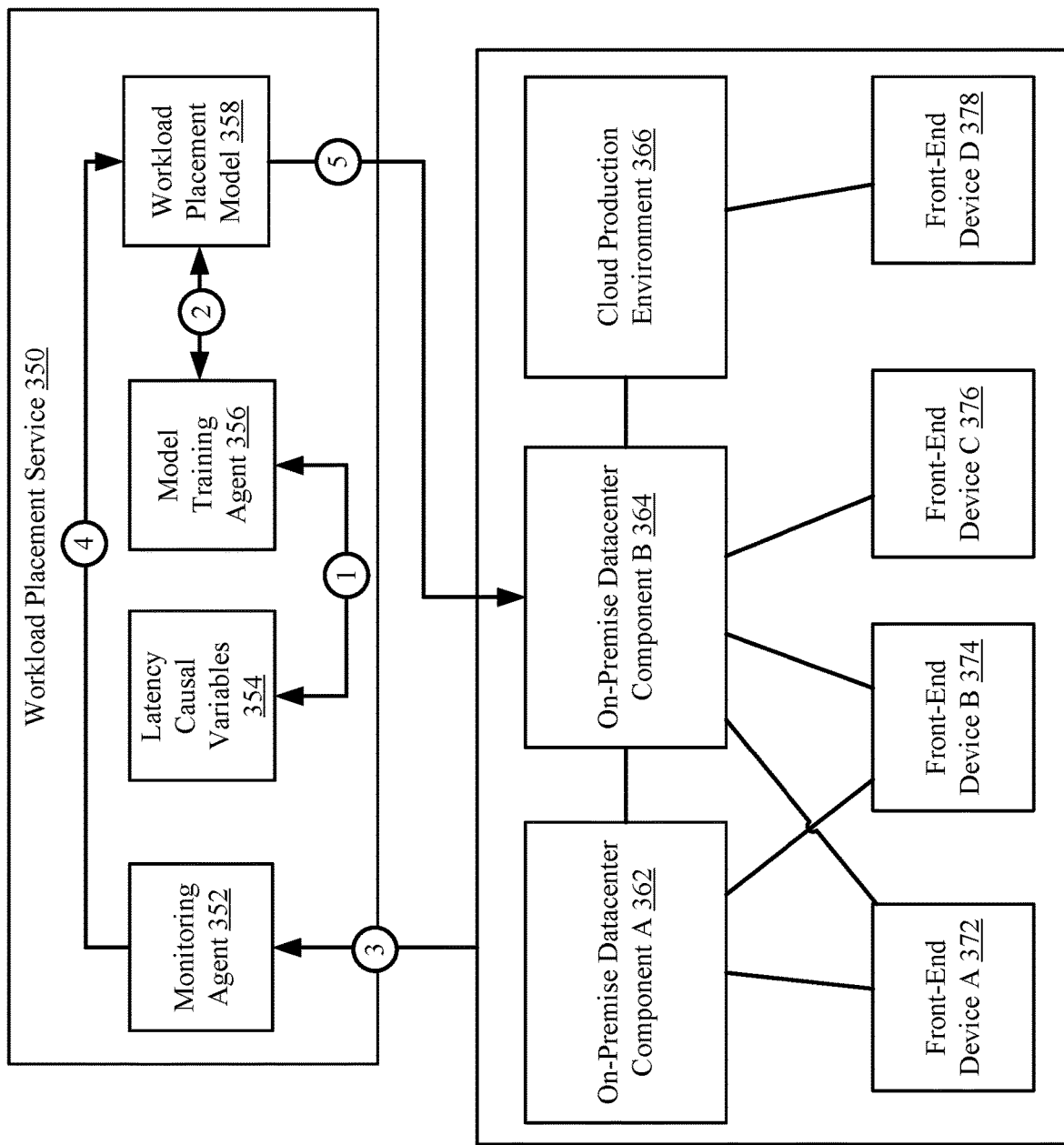
FIG. 3 shows a diagram of a first example system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments disclosed herein include methods and systems for managing the placement of artificial intelligence (AI) workloads in a set of heterogeneous production environments. Each production environment may be a computing device (or logical device) that includes functionality for performing the AI workloads. The AI workloads may include inferencing workloads, training workloads, and model adaptation workloads. In a system of heterogeneous production environments, it may be beneficial to place the corresponding workload in an optimal production environment. The optimal production environment may be determined based on constraints such as, for example, latency minimization, completion time minimization, and security focused.

In one or more embodiments, a workload placement service includes functionality for performing the placement of the aforementioned workloads and optimizing based on an optimized constraint listed above. For example, embodiments of the invention provide a method for placing an inferencing workload on a production environment based on latency minimization between the selected production environment and a front end environment issuing requests for inferencing payloads (e.g., a request for outputting a request for a generative AI model).

In another example, embodiments of the invention provide a selection of a production environment to service a request for an inferencing payload based on whether the request includes any sensitive information. In this example, the workload placement service may select a secure variant or a public variant to service the workload based on security considerations such as whether the request specifies private information or personally identifiable information (PII).

In one or more embodiments, the front end environment includes functionality (e.g., using a browser plug-in) for performing an initial security evaluation, on a request for an inferencing payload, to determine whether the request meets a predetermined criteria for invoking the workload placement service to select a variant to service the request. Alternatively, the selection of the variants based on security considerations may be performed by the front end device, in contrast to being performed by the workload placement service.

The following describes various embodiments of the invention.

FIG. 1.1 shows a system in accordance with one or more embodiments of the invention. The system (101) includes a front-end environment (100), a network (120), one or more production environments (60), and a workload placement service (50). The system (101) may include additional, fewer, and/or different components without departing from scope of the invention. Each component may be operably connected to any of the other component via any combination of wired and/or wireless connections. Each component illustrated in FIG. 1.1 is discussed below.

In one or more embodiments of the invention, the system (101) may provide computer-implemented services (e.g., real-time network monitoring, backup and disaster recovery, server virtualization, etc.) to users. To provide the computer-implemented services to the users, the system (101) may perform computations locally (e.g., at the front-end environment (100) using the front-end devices (32, 34)) and remotely (e.g., away from the front-end environment (100) using back-end devices (see, e.g., FIG. 1.2)). By doing so, the users may utilize different computing devices (e.g., 800, FIG. 8) that have different quantities of computing resources (e.g., processing cycles, memory, storage, etc.) while still being afforded a consistent end-user experience. For example, by performing computations remotely, the system (101) may maintain the user experience provided by the different computing devices even when the different computing devices possess different quantities of computing resources.

In one or more embodiments of the invention, to provide the aforementioned computer-implemented services, the system (101) may include any number of production environments (60) may be utilized by the users. The computer-implemented services provided by the production environments (60) may include AI workloads such as inferencing workloads, training workloads, and model adaptation workloads. The aforementioned AI workloads are described below.

In one or more embodiments, the inferencing workload includes implementing an AI model to output a result. This result may be further referred to as an inferencing payload. The inferencing workload may include storing the AI model (e.g., in one of the production environments (60)) and providing the computing resources (e.g., graphics processing unit (GPU) processing) to apply the AI model to an input obtained from a user via the front-end environment (100).

In one or more embodiments, the inferencing workloads is placed in one of a secured variant or a public variant (see FIG. 1.2). A request by the front-end environment (100) may be assigned to be serviced by an inferencing workload executing on either the secured variant or public variant. The selection of the aforementioned variants may be performed by a variant selection agent. The variant selection agent may operate in the workload placement service (50) (see FIG. 1.3). Alternatively, the variant selection agent (38) may operate in each of the front-end devices (32) as, e.g., a browser plug-in. The variant selection may be performed in accordance with, for example, the method illustrated FIG. 2.3.

In one or more embodiments, the inferencing workloads include obtaining requests for an inferencing payload from the front-end environment (100), applying a corresponding AI model to the request to generate the inferencing payload, and transmitting the inferencing payload to the requesting front-end device (32, 34).

In one or more embodiments, the training workload includes performing the training on a training dataset to obtain the AI model. The training workload may include obtaining the training dataset by, for example, transmitting data from any relevant computing devices to the production environment implementing the training workload. The training workload may further include applying any machine learning algorithm known or currently unknown in the art to generate the AI model.

In one or more embodiments, the model adaptation workload includes applying parameter tuning on existing AI models to tailor a given AI model to the respective use case and/or based on preferred parameters of the AI model to be optimized. The model adaptation workload may include a parameter-efficient fine tuning (PEFT) technique. The PEFT technique includes adapting a subset of the parameters of a pre-trained AI model based on a desire to improve the performance while considering a given set of constraints. In one example, the PEFT technique may modify the pre-trained AI model to reduce the computing resources required to produce an inferencing payload. In this example, the PEFT technique may prioritize the limiting factor of the available computing resources of a production environment (62, 64) implementing the AI model. A model adaptation payload may be generated from the result of a model adaptation workload that specifies the modifications applied to (or to be applied to) the set of parameters of the corresponding AI model.

In one or more embodiments, each front-end device (32, 34) further includes a security variant initial agent (36) that includes functionality for determining whether the request is eligible to go through the variant selection. The security variant initial agent (36) may be implemented as, for example, a browser plug-in of a browser operating in the corresponding front-end device (32, 34). The security variant initial agent (36) may perform the determination for whether the request is eligible in accordance with, for example, the method of FIG. 6.

Figure 8:
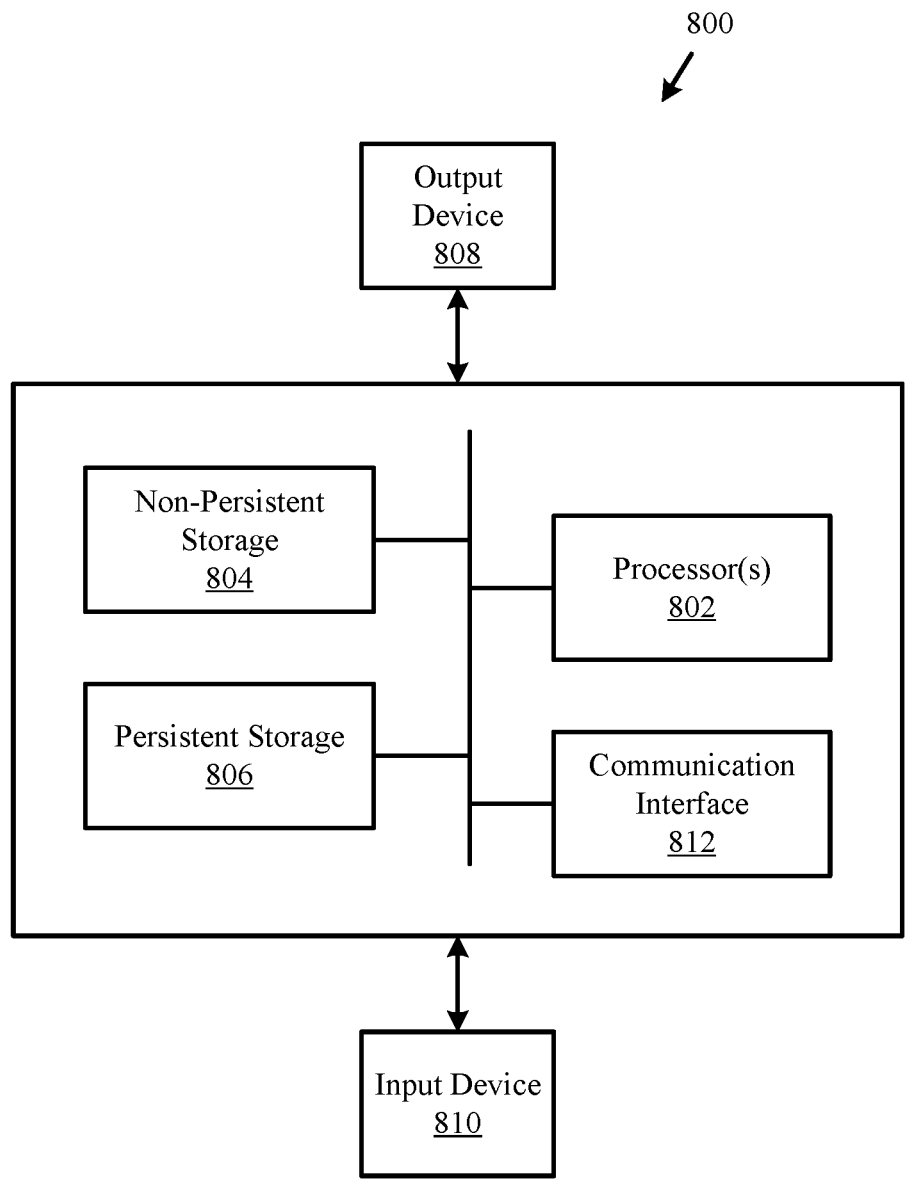
FIG. 8 shows a diagram of a computing device in accordance with one or more embodiments of the invention.

In one or more embodiments of the invention, the front-end devices (32, 34) may be implemented as computing devices (e.g., 800, FIG. 8). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the front-end devices (32, 34) described throughout this application.

Alternatively, in one or more embodiments of the invention, the front-end devices (32, 34) may be implemented as logical devices. A logical device may utilize the computing resources of any number of computing devices to provide the functionality of the front-end devices (32, 34) described throughout this application.

In one or more embodiments of the invention, the above-mentioned system (101) components may operatively connect to one another through a network (120) (e.g., a local area network (LAN), a wide area network (WAN), a mobile network, a wireless LAN (WLAN), etc.). In one or more embodiments, the network (120) may be implemented using any combination of wired and/or wireless connections. The network (120) may encompass various interconnected, network-enabled subcomponents (not shown) (e.g., switches, routers, gateways, etc.) that may facilitate communications between the above-mentioned system (101) components.

In one or more embodiments of the invention, the network-enabled subcomponents may be capable of: (i) performing one or more communication schemes (e.g., Internet protocol communications, Ethernet communications, communications via any security protocols, etc.); (ii) being configured by the computing devices in the network (120); and (iii) limiting communication(s) on a granular level (e.g., on a per-port level, on a per-sending device level, etc.).

In one or more embodiments of the invention, while communicating with the back-end devices (130, 132, FIG. 1.2) remotely over the network (120), the front-end devices (32, 34) may receive, generate, process, store, and/or transmit data structures (e.g., lists, tables, etc.). In one or more embodiments, the data structures may have a predetermined format in accordance with a communication protocol (e.g., a transmission control protocol (TCP), a user datagram protocol (UDP), etc.) implemented by the front-end devices (100), the network-enabled subcomponents, the network (120), and/or the back-end devices (130).

In one or more embodiments of the invention, one or more of the production environments (62, 64) provide computer-implemented services. As discussed above, the computer-implemented services include AI workloads. The production environments (60) may provide the computing resources to implement the AI workloads described throughout this disclosure.

In one or more embodiments of the invention, the production environments (60) are each implemented as a logical device. The logical device may utilize the computing resources of any number of back-end devices to provide the functionality of the production environments (62, 64) described throughout this application. For additional details regarding back-end devices and/or production environments (60), see, e.g., FIG. 1.2.

While the production environments (60) are illustrated as separate entities, one or more of the production environments (62, 64) may be a component of the front-end environment (100). For example, a production environment (62, 64) may be a core location that is relatively close geographically to the front-end devices (32, 34). In this example, the core location may include back-end devices owned by the entity that owns the front-end devices (32, 34). In this manner, the core location is a component of the front-end environment (100).

In one or more embodiments, the placement of the AI workloads in one or more production environments (62, 64) may be managed by a workload placement service (50). Specifically, the workload placement service (50) may utilize any factors to determine where (e.g., in which production environment (62, 64)) to assign the implementation of any of the AI workloads.

In one or more embodiments, the workload placement service (50) determines the production environment (62, 64) in which to install the AI workloads based on parameters such as, for example, latency minimization (see, e.g., the methods of FIGS. 2.1 and 4.1), completion time minimization (see, e.g., FIGS. 2.2 and 4.2), or security considerations (see, e.g., FIGS. 2.3, 4.3, and 6). For additional details regarding the workload placement service (50), see, e.g., FIG. 1.3.

In one or more embodiments, the workload placement service (50) determines the production environment (62, 64) in which to install the AI workloads based on the computing resources of the production environments (60). For example, after an initial installation of an AI workload in a production environment, the workload placement service (50) monitors the computing resource usage of the computing resources in the production environment. The computing resources being monitored may include, for example, the processing components (e.g., central processing units (CPUs), graphics processing units (GPUs), etc.), memory components (e.g., RAM, ROM, etc.), storage capability, network bandwidth, and/or any other resources without departing from the invention. After the monitoring is complete, the measured computing resource use may be input into a machine learning model (e.g., a regression model), and the output may determine whether a reassignment is required. If a reassignment is required, the workload placement service (50) may provide, to the administrator (not shown), a recommendation for a reassignment that includes the recommended new production environment. The reassignment may be performed based on whether an administrator (not shown) confirms the recommendation.

In one or more embodiments of the invention, the workload placement service (50) may be implemented as a computing device (e.g., 800, FIG. 8). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the workload placement service (50) described throughout this application, including, e.g., the methods of FIGS. 2.1-2.3, 4.1-4.3, and 6.

Alternatively, in one or more embodiments of the invention, the workload placement service (50) may be implemented as a logical device. The logical device may utilize the computing resources of any number of computing devices to provide the functionality of the workload placement service (50) described throughout this application including, e.g., the methods of FIGS. 2.1-2.2. For additional details regarding the workload placement service (50), see, e.g., FIG. 1.3.

FIG. 1.2 shows a diagram of a production environment in accordance with one or more embodiments of the invention. The production environment (66) illustrated in FIG. 1.2 may be an embodiment of a production environment (62, 64) discussed in FIG. 1.1. Turning to FIG. 1.2, the production environment (66) includes a set of back-end devices (130, 132). The production environment (66) may include additional, fewer, and/or different components without departing from scope of the invention. Each component may be operably connected to any of the other component via any combination of wired and/or wireless connections. Each component illustrated in FIG. 1.2 is discussed below.

In one or more embodiments of the invention, to provide the computer-implemented services such as the AI workloads discussed throughout, the back-end devices (132, 132) may include any computing resources (not shown) that enable the back-end devices (130, 132) to implement the AI workloads. The AI workloads that may be performed by the back-end devices (130, 132) include, but are not limited to: inferencing workloads (142), training workloads (144), and model adaptation workloads (146). The implementations of the aforementioned AI workloads may be assigned to the production environment (66) by the workload placement service (50) (or other entities) in accordance with the methods of FIGS. 2.1-2.3, 4.1-4.3, and 6.

In one or more embodiments, the back-end devices (130) may further implement secured variants (148) and public variants (150). Each of the secured variants (148) and the public variant (150) may be a provisioning of the back-end devices (130, 132) that implements one or more AI workloads. For example the secured variants (148) and the public variants (150) may each host an inferencing workload that implements an instance of an AI model.

The secured variants (148) may include functionality for securely obtaining information from a request to obtain an inferencing payload and for securely implementing an instance of an AI model using the obtained information to generate the inferencing payload. The instance of the AI model may be implemented securely by limiting the feedback mechanism of the information specified in the request for future training and/or for any future requests for inferencing payloads. In this manner, any information included in a request serviced by the secured variants (148) may not be inadvertently used (or otherwise accessed) by other users. By implementing the AI workloads while limiting the use of these requests for future training, the secured variants (148) favors security of the information obtained over the optimization of performance of the AI workloads operating in the secured variants (148).

In one or more embodiments, the secured variants (148) may be further accessed by the front-end devices using any private network paths (e.g., via a virtual private network (VPN)). In this manner, an additional level of security is provided on the information transmitted between the user and the production environment (66) hosting the secured variants (148).

In contrast to the secured variants (148), the public variants (150) may favor performance of its corresponding AI workloads over security. In one or more embodiments, the information obtained by the public variants from requests for inferencing payloads may be used for future training (e.g., using training workloads (144)) of the AI models implemented by the public variants (150).

In one or more embodiments of the invention, the back-end devices (130, 132) may be implemented as computing devices (e.g., 800, FIG. 8). A computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the back-end devices (130, 132) described throughout this application.

Alternatively, in one or more embodiments of the invention, similar to the front-end devices, the back-end devices (130) may also be implemented as logical devices, as discussed above.

As discussed above, the workload placement service (50, FIG. 1.1) includes functionality for determining a placement of the virtual desktop service manager (140) based on one or more factors.

Turning now to FIG. 1.3, FIG. 1.3 shows a diagram of a workload placement service. The workload placement service (52) may be an embodiment of the workload placement service (50, FIG. 1.1) discussed above. The workload placement service (52) includes a monitoring agent (162), a workload placement model training agent (164), a variant selection agent (166), and storage (170). The workload placement service (52) may include additional, fewer, and/or different components without departing from scope of the invention. Each component may be operably connected to any of the other component via any combination of wired and/or wireless connections. Each component illustrated in FIG. 1.3 is discussed below.

In one or more embodiments, the monitoring agent (162) includes functionality for obtaining telemetry data (172) by monitoring the operation of AI workloads in a placed production environment. The monitoring agent (162) may obtain the telemetry data (172) after the initial placement of an AI workload and in accordance with the methods of FIGS. 2.1-7.

In one or more embodiments, the workload placement model training agent (164) includes functionality for using causal variables (174), the telemetry data (172), and/or other data to train a workload placement model (176). The workload placement model (176) may be generated using, for example, a regression algorithm that relates any number of variables specified by the causal variables (174) to an optimal production environment.

In one or more embodiments, the variant selection agent (166) includes functionality for processing a request for an inferencing payload from a front-end device and making a selection about a variant to be used to process the request. The selection may be performed in accordance with, for example, the method of FIG. 2.3.

In one or more embodiments of the invention, the telemetry data (172) is a data structure that specifies measurements of the resource utilization of computing resources in one or more production environments following the assignment of an AI workload on the one or more production environments. The telemetry data (172) may specify, for example, processing usage, memory usage, storage utilization, network bandwidth, and/or latency time in communications between a front-end user issuing requests for inferencing payloads and the production environments servicing the requests. Other metrics may be specified in the telemetry data (172) without departing from the invention. At least a portion of the telemetry data (172) may be input into the workload placement model (176) to obtain a placement recommendation in accordance with FIGS. 2.1-2.3 and 4.1-4.3.

In one or more embodiments of the invention, the causal variables (174) are data structures that specify variables that may impact the performance of AI workloads in a given production environment. Examples of causal variables include, but are not limited to: clock speed of back-end device GPU, an architecture of system GPUs, a number of GPUs used, a distribution of models across GPUs, the GPU-to-GPU interconnect technology used to implement AI workloads, the interconnect speed, protocol between backend devices implementing AI workloads, storage size, and batch size used during AI workload implementation.

In one or more embodiments, the workload placement model (176) is a data structure that inputs any portion of telemetry data (172), inputs a parameter to be optimized (e.g., latency minimization, completion time minimization, etc.), and a type of a given AI workload to be assigned (e.g., an inferencing workload, a training workload, or a model adaptation workload) to outputs a selected production environment to be used for the given AI workload.

In one or more embodiments, the workload placement service (52) utilizes a set of initial placement policies (178) to initially assign an AI workload to be implemented. The initial placement policies (178) may be data structures that each specify an initial condition, rule, or policy for initially assigning an AI workload to a production environment. The workload placement service (52) may initially install an AI workload to one of the production environments discussed throughout this disclosure, and, after monitoring the operation of the installed AI workload, may utilize the workload placement model (176) to assign an ideal production environment based on the latency metrics (178) obtained during the monitoring and further based on a given parameter to be optimized.

FIG. 2.1 shows a flowchart of a method of determining an inferencing workload placement based on latency minimization in accordance with one or more embodiments of the invention. The method shown in FIG. 2.1 may be performed by, for example, a workload placement service (e.g., 50, FIG. 1.1). Other components of the system in FIG. 1.1 may perform all, or a portion, of the method of FIG. 2.1 without departing from the invention.

While FIG. 2.1 is illustrated as a series of steps, any of the steps may be omitted, performed in a different order, additional steps may be included, and/or any or all of the steps may be performed in a parallel and/or partially overlapping manner without departing from the invention.

Turning to FIG. 2.1, in step 200, a request for an inferencing workload placement is obtained. In one or more embodiments, the request specifies performing a placement (e.g., selecting a production environment) of an inferencing workload based on latency minimization in communication between the front-end devices issuing requests on the inferencing workload and the production environment implementing the inferencing workload. The request may be obtained from an administrator of a front-end environment. The front-end environment may utilize the services of a selected production environment to provide inferencing payloads to the front-end environment.

In step 202, an initial workload placement of the inferencing workload on a production environment is performed. In one or more embodiments, the initial workload placement is based on an initial placement policy (discussed in FIG. 1.3).

In step 204, the execution of the inferencing workload on the initial production environment is monitored to obtain telemetry data. The monitoring may be performed by, for example, a monitoring agent (see FIG. 1.3) of the workload placement service. In one or more embodiments, the telemetry data obtained from the monitoring includes a time taken for communication between the initial production environment and the front-end environment issuing the requests for inferencing payloads. The monitoring may be performed for a pre-determined amount of time.

In step 206, a latency analysis is performed using the obtained telemetry data and using causal variables to generate a placement recommendation for placing the inferencing workload in a selected production environment. In one or more embodiments, the latency analysis includes analyzing the telemetry data to obtain the corresponding latency metrics, inputting the latency metrics to a workload placement model (which has been generated using the causal variables as discussed in FIG. 1.3) to output the placement recommendation. The workload placement model may further input a dataset of currently available hardware configurations of the production environments in the system to output the placement recommendation.

In step 208, a determination is made about whether the selected production environment specified as the placement recommendation is different from the initial production environment. If the selected production environment differs from the initial production environment, the method proceeds to step 210; otherwise, the method ends following step 208.

In step 210, a deployment of the inferencing workload to a selected production environment is initiated. In one or more embodiments, the deployment is initiated by sending the placement recommendation to an administrator of the front-end environment, obtaining confirmation of the reassignment, and initiating a migration of the inferencing workload to the selected production environment. The deployment may be initiated via any other methodology without departing from the invention. For example, the deployment may be performed by the workload placement service automatically (i.e., without involving the administrator).

FIG. 2.2 shows a flowchart of a method of determining a training workload placement based on completion time in accordance with one or more embodiments of the invention. The method shown in FIG. 2.2 may be performed by, for example, the workload placement service (e.g., 50, FIG. 1.1). Other components of the system in FIG. 1.1 may perform all, or a portion, of the method of FIG. 2.2 without departing from the invention.

While FIG. 2.2 is illustrated as a series of steps, any of the steps may be omitted, performed in a different order, additional steps may be included, and/or any or all of the steps may be performed in a parallel and/or partially overlapping manner without departing from the invention.

Turning to FIG. 2.2, in step 220, a request for a training workload placement is obtained. In one or more embodiments, the request specifies performing a placement (e.g., selecting a production environment) of the training workload based on completion time minimization for the execution of the training workload. The completion time may be a time taken between initiating the training and completing the generation of an AI model. The request may be obtained from an administrator of a front-end environment. The front-end environment may utilize the services of a selected production environment to generate the AI model.

In step 222, an initial workload placement of the training workload on a production environment is performed. In one or more embodiments, the initial workload placement is based on an initial placement policy (discussed in FIG. 1.3).

In step 224, the execution of the training workload on the initial production environment is monitored to obtain telemetry data. The monitoring may be performed by, for example, a monitoring agent (see FIG. 1.3) of the workload placement service. In one or more embodiments, the telemetry data obtained from the monitoring includes a time taken for a portion of the training to be performed. The monitoring may be performed for a pre-determined amount of time or based on a percentage of the training completed.

In step 226, a completion time analysis is performed using the obtained telemetry data and using causal variables to generate a placement recommendation for placing the training workload in a selected production environment. In one or more embodiments, the latency analysis includes analyzing the telemetry data to obtain the corresponding training metrics and/or other performance metrics, inputting the obtained metrics to a workload placement model (which has been generated using the causal variables as discussed in FIG. 1.3) to output the placement recommendation. The workload placement model may further input a dataset of currently available hardware configurations of the production environments in the system to output the placement recommendation.

In step 228, a determination is made about whether the selected production environment specified as the placement recommendation is different from the initial production environment. If the selected production environment differs from the initial production environment, the method proceeds to step 230; otherwise, the method ends following step 228.

In step 230, a deployment of the training workload to a selected production environment is initiated. In one or more embodiments, the deployment is initiated by sending the placement recommendation to an administrator of the front-end environment, obtaining confirmation of the reassignment, and initiating a migration of the training workload to the selected production environment. The deployment may be initiated via any other methodology without departing from the invention. For example, the deployment may be performed by the workload placement service automatically (i.e., without involving the administrator).

FIG. 2.3 shows a flowchart of a method of a security-based inferencing workload placement in accordance with one or more embodiments of the invention. The method shown in FIG. 2.3 may be performed by, for example, a variant selection agent (e.g., 38, FIG. 1.1 or 166, FIG. 1.3). Other components of the system in FIGS. 1.1-1.3 may perform all, or a portion, of the method of FIG. 2.3 without departing from the invention.

While FIG. 2.3 is illustrated as a series of steps, any of the steps may be omitted, performed in a different order, additional steps may be included, and/or any or all of the steps may be performed in a parallel and/or partially overlapping manner without departing from the invention.

In step 240, a request for an inferencing workload is obtained. The request may include a prompt to be applied to an AI model. The application of the AI model to the prompt may be performed using an inferencing workload. In response to the request, the variant selection agent may select a variant in which to execute the inferencing workload.

In one or more embodiments, the request includes a model adaptation payload. The model adaptation payload may be generated using a model adaptation workload (e.g., a PEFT component) initiated by the variant selection agent in accordance with the method of FIG. 4.3 below.

In step 242, a payload classification is performed on the request to determine a variant selection for the inferencing workload. In one or more embodiments, the payload classification includes analyzing the contents of the prompt included in the request to identify any personally identifiable information (PII), any private information such as financial information or health information associated with a user, and/or any other information associated with a user that may be considered sensitive. The identification of such sensitive information may be performed using, for example, a trained AI model such as a logistic regression model that classifies such information. Based on the level of sensitivity of the information included in the prompt, a determination may be made about which variant the request is to be transmitted to for servicing. For example, if the level of sensitivity of the prompt meets a pre-defined threshold, the request is assigned to a secured variant. In this example, if the level of sensitivity of the prompt does not meet or exceed the pre-defined threshold, the request is assigned to a public variant.

In step 244, a determination is made about whether the selected variant is a secured variant or a public variant. If the selected variant is a public variant, the method proceeds to step 246; if the selected variant is a secured variant, the method proceeds to step 250.

In step 246, following the determination that the selected variant is a public variant, the request of step 240 is transmitted to the public variant. In one or more embodiments, an inferencing workload executing on the public variant processes the request using a corresponding AI model to generate the inferencing payload.

In step 248, after the inferencing workload of the public variant processes the request, the variant selection agent obtains the inferencing payload from the public variant. See, e.g., FIG. 1.2 for additional details regarding the public variant.

Turning to step 250, following the determination that the selected variant determined in step 244 is a secured variant, the request for the inferencing payload is transmitted to the secured variant. In one or more embodiments, the request is transmitted via a private network path to a back-end device executing the secured variant. In one or more embodiments, an inferencing workload executing on the secured variant processes the request using a corresponding AI model to generate the inferencing payload.

In step 252, after the inferencing workload of the public variant processes the request, the variant selection agent obtains the inferencing payload from the secured variant. See, e.g., FIG. 1.2 for additional details regarding the secured variant.

In step 254, following the obtaining of the inferencing payload from the respective variant, the inferencing payload is provided to the front-end device.

To further clarify embodiments of the invention described in, at least, FIG. 2.1, a first non-limiting example is provided in FIG. 3. For the sake of brevity, only a limited number of components of the example system of FIGS. 1.1-1.3 are illustrated in FIG. 3. The example in FIG. 3 may illustrate processes performed by components of the example system and labeled using circled numbers and described below using brackets in numbers (e.g., "[1]").

Example 1

Consider a scenario in which a generative artificial intelligence (AI) model is to be implemented among a system of production environments. The generative AI model may use a set of images to generate an AI-compiled image based on a specified set of parameters. The determination of which production environment to utilize for the AI workload is determined based on a latency minimization.

Turning to FIG. 3, FIG. 3 shows a diagram of an example system. The example system includes a workload placement service (350), two on-premise datacenter components (362, 364) and a cloud production environment (366). Each of the on-premise datacenter components (362, 364) and the cloud production environment (366) On-premise datacenter component A (362) (also referred to as component A) may include a large number of GPUs but include a direct connection to front-end devices A and B (372, 374). On-premise datacenter component B (364) (also referred to component B) includes a lower number of GPUs relative to component A (362), and has a high bandwidth connection to front-end devices A, B, and C (372, 374, 376). The cloud production environment (366) further includes a high bandwidth connection to front-end device A (378).

Prior to obtaining the request for assigning an inferencing workload for the generative AI model, a workload placement model (358) is generated. The workload placement model is generated by a model training agent (356) that performs the training using latency causal variables (354) [1]. Specifically, the latency causal variables (354) specify a training dataset for various factors that may impact the latency of implementing the inferencing workload. The various factors may include, for example, the clock speed of the GPUs used for the inferencing workload, the bandwidth between the production environment implementing the workload and the front-end devices (372, 374, 376, 378). After the training, the workload placement model (358) is generated as a regression-type model that takes as an input the current hardware configurations of the available production environments (362, 364, 366) and any telemetry data to output a placement recommendation that selects one of the production environments (362, 364, 366) [2].

At a later point in time, the request for placing the inferencing workload is obtained by the workload placement service (350). The workload placement service performs an initial placement of the inferencing workload on on-premise datacenter A (362) based on an initial placement policy (not shown). After the initial placement, the inferencing workload is monitored by a monitoring agent (352) of the workload placement service (350). The monitoring agent (352) obtains telemetry data associated with the implementation of the inferencing workload on on-premise datacenter component A (362) [3]. The telemetry data specifies latency information about the time taken for the inferencing workload to obtain the requests from the front-end devices (372, 374, 376, 378), the time taken to apply the generative AI model on the requests, and providing the inferencing payload to the front-end devices (372, 374, 376, 378). In this example, the limiting factor increasing the latency is the transfer of the images between the front-end devices (372, 374, 376, 378) and component A (362).

The telemetry data obtained by the monitoring agent (352) is input into the workload placement model (358) along with a set of current hardware configurations of the production environments (362, 364, 366) [4]. The workload placement model (358) outputs a placement recommendation specifying a more optimal placement of the inferencing workload [5]. The more optimal placement is specified as component B (364) given its higher bandwidth connections to more front-end devices (372, 374, 376). An administrator (not shown) of the example system of FIG. 3 performs the migration of the inferencing workload to component B (364).

End of Example 1

FIG. 4.1 shows a flowchart of a method of determining a model adaptation workload placement based on latency minimization in accordance with one or more embodiments of the invention. The method shown in FIG. 4.1 may be performed by, for example, a workload placement service (e.g., 50, FIG. 1.1). Other components of the system in FIG. 1.1 may perform all, or a portion, of the method of FIG. 4.1 without departing from the invention.

While FIG. 4.1 is illustrated as a series of steps, any of the steps may be omitted, performed in a different order, additional steps may be included, and/or any or all of the steps may be performed in a parallel and/or partially overlapping manner without departing from the invention.

Turning to FIG. 4.1, in step 400, a request for a model adaptation workload placement is obtained. In one or more embodiments, the request specifies performing a placement (e.g., selecting a production environment) of a model adaptation workload based on latency minimization in communication between the production environment implementing a corresponding inferencing workload and the production environment implementing the model adaptation workload. The front-end environment may utilize the services of a selected production environment to fine-tune an AI model associated with the model adaptation workload.

In step 402, an initial workload placement of the model adaptation workload on a production environment is performed. In one or more embodiments, the initial workload placement is based on an initial placement policy (discussed in FIG. 1.3).

In step 404, the execution of the model adaptation workload on the initial production environment is monitored to obtain telemetry data. The monitoring may be performed by, for example, a monitoring agent (see FIG. 1.3) of the workload placement service. In one or more embodiments, the telemetry data obtained from the monitoring includes a time taken for communication between the initial production environment and the production environment implementing the corresponding inferencing workload. The monitoring agent may further monitor communication between the production environment(s) implementing the inferencing workloads and the model adaptation workload and the front-end devices issuing the requests for inferencing payloads. The monitoring may be performed for a pre-determined amount of time.

In step 406, a latency analysis is performed using the obtained telemetry data and using causal variables to generate a placement recommendation for placing the model adaptation workload in a selected production environment. In one or more embodiments, the latency analysis includes analyzing the telemetry data to obtain the corresponding latency metrics, inputting the latency metrics to a workload placement model to output the placement recommendation. The workload placement model may further input a dataset of currently available hardware configurations of the production environments in the system to output the placement recommendation.

In step 408, a determination is made about whether the selected production environment specified as the placement recommendation is different from the initial production environment. If the selected production environment differs from the initial production environment, the method proceeds to step 410; otherwise, the method ends following step 408.

In step 410, a deployment of the inferencing workload to a selected production environment is initiated. In one or more embodiments, the deployment is initiated by sending the placement recommendation to an administrator of the front-end environment, obtaining confirmation of the reassignment, and initiating a migration of the model adaptation workload to the selected production environment. The deployment may be initiated via any other methodology without departing from the invention. For example, the deployment may be performed by the workload placement service automatically (i.e., without involving the administrator).

FIG. 4.2 shows a flowchart of a method of determining a model adaptation workload placement based on completion time in accordance with one or more embodiments of the invention. The method shown in FIG. 4.2 may be performed by, for example, the workload placement service (e.g., 50, FIG. 1.1). Other components of the system in FIG. 1.1 may perform all, or a portion, of the method of FIG. 4.2 without departing from the invention.

While FIG. 4.2 is illustrated as a series of steps, any of the steps may be omitted, performed in a different order, additional steps may be included, and/or any or all of the steps may be performed in a parallel and/or partially overlapping manner without departing from the invention.

Turning to FIG. 4.2, in step 420, a request for a model adaptation workload placement is obtained. In one or more embodiments, the request specifies performing a placement (e.g., selecting a production environment) of the training workload based on completion time minimization for the execution of the model adaptation workload. The completion time may be a time taken between initiating the model adaptation (e.g., the PEFT technique) and completing the fine-tuning of a corresponding AI model. The request may be obtained from an administrator of a front-end environment. The front-end environment may utilize the services of a selected production environment to modify the AI model.

In step 422, an initial workload placement of the model adaptation workload on a production environment is performed. In one or more embodiments, the initial workload placement is based on an initial placement policy (discussed in FIG. 1.3).

In step 424, the execution of the model adaptation workload on the initial production environment is monitored to obtain telemetry data. In one or more embodiments, the telemetry data obtained from the monitoring includes a time taken for a portion of the model adaptation (e.g., the PEFT) to be performed. The monitoring may be performed for a pre-determined amount of time or based on a percentage of the model adaptation completed.

In step 426, a completion time analysis is performed using the obtained telemetry data and using causal variables to generate a placement recommendation for placing the model adaptation workload in a selected production environment. In one or more embodiments, the latency analysis includes analyzing the telemetry data to obtain the corresponding training metrics and/or other performance metrics, inputting the obtained metrics to a workload placement model (which has been generated using the causal variables as discussed in FIG. 1.3) to output the placement recommendation. The workload placement model may further input a dataset of currently available hardware configurations of the production environments in the system to output the placement recommendation.

In step 428, a determination is made about whether the selected production environment specified as the placement recommendation is different from the initial production environment. If the selected production environment differs from the initial production environment, the method proceeds to step 430; otherwise, the method ends following step 428.

In step 430, a deployment of the training workload to a selected production environment is initiated. In one or more embodiments, the deployment is initiated by sending the placement recommendation to an administrator of the front-end environment, obtaining confirmation of the reassignment, and initiating a migration of the model adaptation workload to the selected production environment. The deployment may be initiated via any other methodology without departing from the invention. For example, the deployment may be performed by the workload placement service automatically (i.e., without involving the administrator).

FIG. 4.3 shows a flowchart of a method of a security-based model adaptation workload placement in accordance with one or more embodiments of the invention. The method shown in FIG. 4.3 may be performed by, for example, a variant selection agent (e.g., 38, FIG. 1.1 or 166, FIG. 1.3). Other components of the system in FIGS. 1.1-1.3 may perform all, or a portion, of the method of FIG. 4.3 without departing from the invention.

While FIG. 4.3 is illustrated as a series of steps, any of the steps may be omitted, performed in a different order, additional steps may be included, and/or any or all of the steps may be performed in a parallel and/or partially overlapping manner without departing from the invention.

In step 440, a request for an inferencing workload is obtained. The request may include a prompt to be applied to an AI model. The application of the AI model to the prompt may be performed using a corresponding inferencing workload. For the AI model described in FIG. 4.3, a model adaptation workload is to be applied to obtain a model adaptation workload. The AI model may be applied to the model adaptation payload to obtain an adapted AI model. The adapted AI model may be applied to the prompt to obtain an inferencing payload.

In step 442, a model adaptation classification is performed on the request to determine a variant selection for a model adaptation workload associated with the inferencing workload. In one or more embodiments, the model adaptation classification includes analyzing the contents of the prompt included in the request to identify any personally identifiable information (PII), any private information such as financial information or health information associated with a user, and/or any other information associated with a user that may be considered sensitive. The identification of such sensitive information may be performed using, for example, a trained AI model such as a logistic regression model that classifies such information. Based on the level of sensitivity of the information included in the prompt, a determination may be made about which variant the request is to be transmitted to for servicing. For example, if the level of sensitivity of the prompt meets a pre-defined threshold, the request is assigned to a secured variant. In this example, if the level of sensitivity of the prompt does not meet or exceed the pre-defined threshold, the request is assigned to a public variant.

In step 444, a determination is made about whether the selected variant is a secured variant or a public variant. If the selected variant is a public variant, the method proceeds to step 446; if the selected variant is a secured variant, the method proceeds to step 450.

In step 446, following the determination that the selected variant is a public variant, the request of step 440 is transmitted to the public variant. In one or more embodiments, a model adaptation workload executing on the public variant processes the request using a corresponding AI model to generate the model adaptation payload.

In step 448, after the model adaptation workload of the public variant processes the request, the variant selection agent obtains the model adaptation payload from the public variant.

Turning to step 450, following the determination that the selected variant determined in step 444 is a secured variant, the request for the model adaptation payload is transmitted to the secured variant. In one or more embodiments, the request is transmitted via a private network path to a back-end device executing the secured variant. In one or more embodiments, a model adaptation workload executing on the secured variant processes the request using a corresponding AI model to generate the model adaptation payload.

In step 452, after the model adaptation workload of the public variant processes the request, the variant selection agent obtains the model adaptation payload from the secured variant.

In step 454, following the obtaining of the inferencing payload from the respective variant, the model adaptation payload is processed as a request for an inferencing payload in accordance with FIG. 2.3. In one or more embodiments, the processing includes using the model adaptation payload to modify an AI model to obtain an adapted AI model. In this manner, the AI model applied to the request as discussed in FIG. 2.3 is the adapted AI model.

Figure 5:
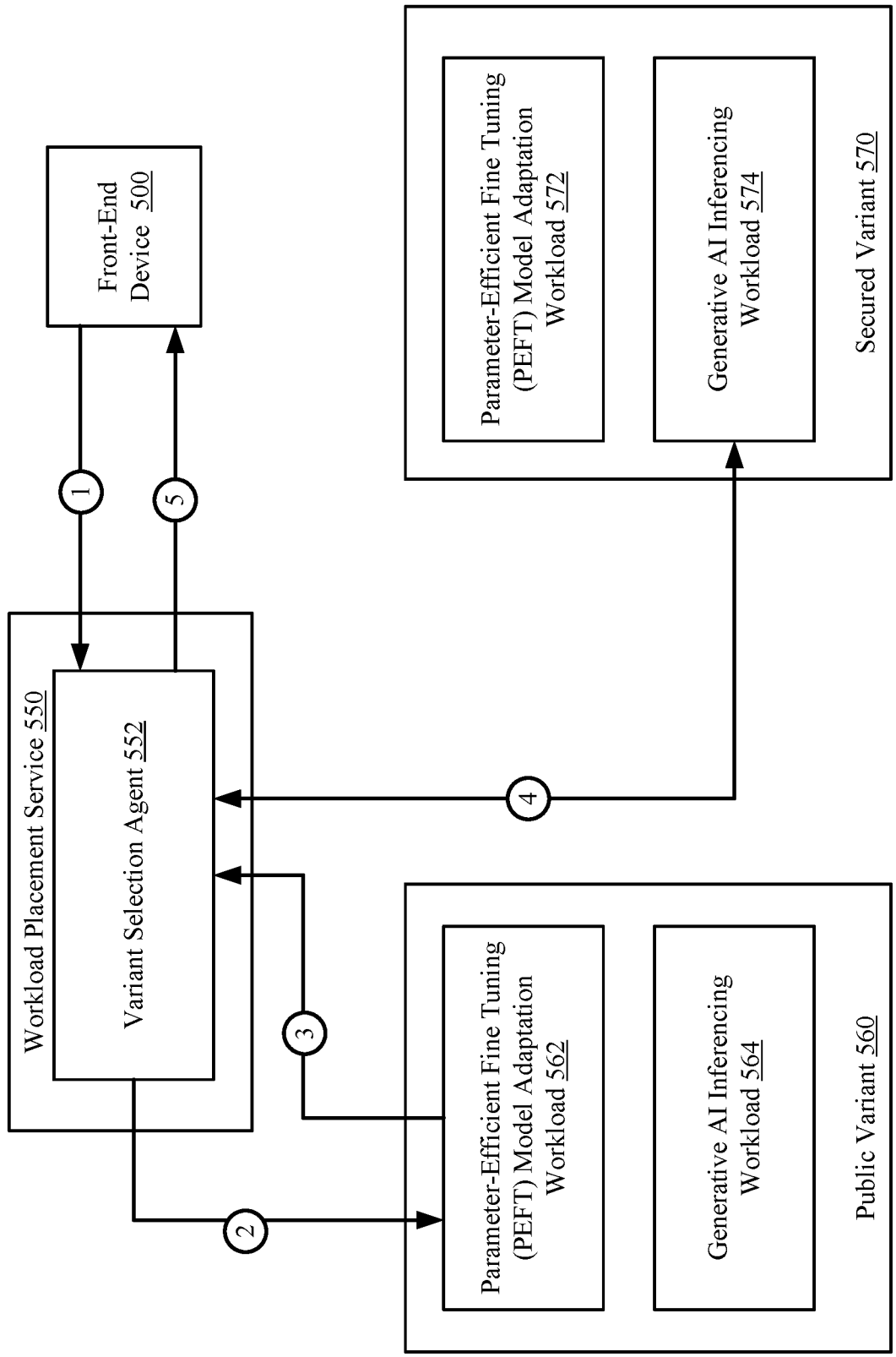
FIG. 5 shows a diagram of a second example system in accordance with one or more embodiments of the invention.

To further clarify embodiments of the invention described in, at least, FIGS. 2.3 and 4.3, a second non-limiting example is provided in FIG. 5. For the sake of brevity, only a limited number of components of the example system of FIGS. 1.1-1.3 are illustrated in FIG. 5. The example in FIG. 5 may illustrate processes performed by components of the example system and labeled using circled numbers and described below using brackets in numbers (e.g., "[1]").

Example 2

Consider a scenario in which a workload placement service determines a variant to service requests for inferencing payloads. The requests may specify an AI model that includes a performance-efficient fine tuning (PEFT) model adaptation workload for adapting the pre-trained AI model based on the performance of the computing resources implementing the AI models. The pre-trained model is a generative language model that generates text based on a text input prompt.

Turning to FIG. 5, FIG. 5 shows a diagram of a second example system. The second example system includes a workload placement service (550) that implements a variant selection agent (552) that performs the variant selection for AI workloads in accordance with FIGS. 2.3 and 4.3. The variant selection agent (552) communicates with a front-end device (500) to obtain requests for inferencing payloads and to provide such inferencing payloads.

The front-end device (500) sends a request for an inferencing payload for the generative language model [1]. The request includes personal health information associated with a user of the front-end device (500). The variant selection agent (552), in response to receiving the request, performs a variant selection in accordance with FIG. 4.3 to determine a variant in which to perform the model adaptation. In this example, the model adaptation is not required to be private. As such, the variant selection agent (552) performs the model adaptation classification on the request to determine that a PEFT model adaptation workload is to be performed in a public variant (560). The variant selection agent (552) transmits a request for implementing the PEFT model adaptation workload (562) on the public variant (560) [2]. The public variant (560) implements the PEFT model adaptation workload (562) to obtain a model adaptation payload that specifies the modified subset of parameters to be implemented on the generative AI model prior to servicing the request. The model adaptation payload is provided to the variant selection agent (552) [3].

After obtaining the model adaptation payload, the variant selection agent (552) performs a payload classification on the request and the model adaptation payload to determine that the request is to be serviced at the secured variant (570). Based on this determination, the variant selection agent provides the request and the model adaptation payload to the secured variant (570) to be processed by a generative AI inferencing workload (574) [4]. The generative AI inferencing workload (574) includes modifying the language model in accordance with the model adaptation workload and generating the text output by applying the modified language model on the obtained personal health information and providing the text output to the variant selection agent (552). The variant selection agent (552) provides the text output to the front-end device (500) [5].

End of Example 2

Figure 6:
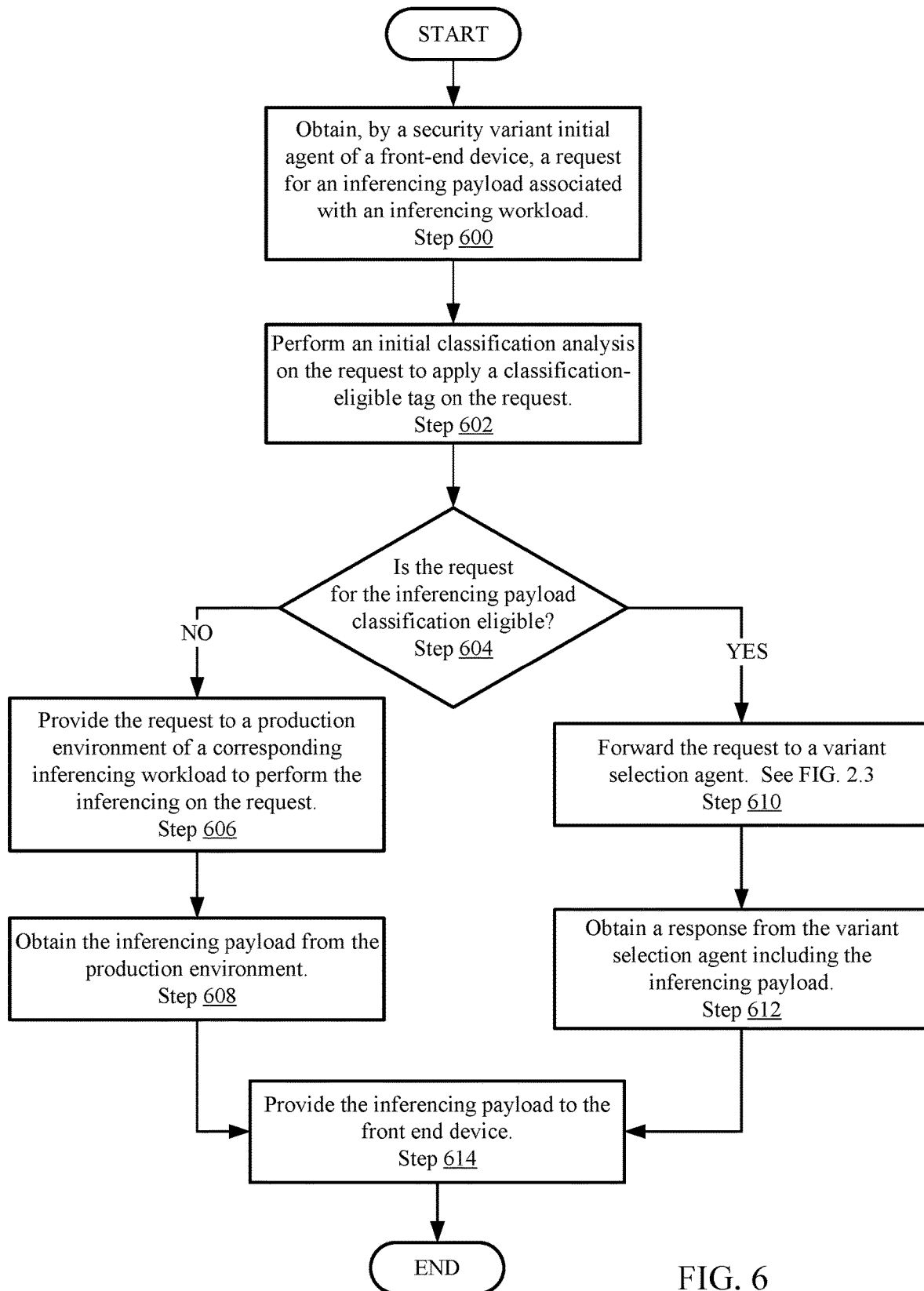
FIG. 6 shows a flowchart of a method of enforcing security-based allocation at a front-end environment in accordance with one or more embodiments of the invention.

FIG. 6 shows a flowchart of a method of enforcing security-based allocation at a front-end environment in accordance with one or more embodiments of the invention. The method shown in FIG. 6 may be performed by, for example, a security variant initial agent (e.g., 36, FIG. 1.1). Other components of the system in FIGS. 1.1-1.3 may perform all, or a portion, of the method of FIG. 6 without departing from the invention.

While FIG. 6 is illustrated as a series of steps, any of the steps may be omitted, performed in a different order, additional steps may be included, and/or any or all of the steps may be performed in a parallel and/or partially overlapping manner without departing from the invention.

In step 600, a request for an inferencing workload is obtained. The request may include a prompt to be applied to an AI model. The application of the AI model to the prompt may be performed using a corresponding inferencing workload. The AI model may be implemented using an inferencing workload.

In step 602, an initial classification analysis is performed on the request to apply a classification-eligible tag on the request. In one or more embodiments, the initial classification analysis includes implementing a conditions for determining whether the request meets a set of criteria for processing the request using the variant selection agent and in accordance with FIG. 2.3. If the request meets the set of criteria, the request may be tagged with the classification-eligible tag. Examples of criteria that may be used to evaluate the request include, but are not limited to: a length or size of the prompt, whether the prompt includes specific phrases, whether the request is obtained using a private network (e.g., a VPN), and criteria associated with a user account issuing the request.

In step 604, a determination is made about whether the request is classification-eligible. If the request is classification-eligible, the method proceeds to step 610; otherwise, the method proceeds to step 606.

In step 606, following the determination that the request is not classification-eligible, the request of step 600 is transmitted to a production environment implementing the corresponding inferencing workload to perform the inferencing on the request. In one or more embodiments, the request is serviced using a corresponding AI model to generate the inferencing payload. In this step, the security variant initial agent does not consider the variant (e.g., public variant or secured variant) when determining which inferencing workload services the request.

In step 608, after the inferencing workload processes the request, the inferencing payload is obtained from the production environment.

Turning to step 610, following the determination that the request is classification-eligible, the request for the inferencing payload is transmitted to a variant selection agent. In one or more embodiments, the variant selection agent performs the method of FIG. 2.3 to service the request. Specifically, the variant selection agent may select a variant to be used for servicing the request to generate the inferencing workload.

In step 612, after the variant selection agent processes the request, the inferencing payload is obtained from the variant selection agent.

In step 614, following the obtaining of the inferencing payload from the respective entity, the inferencing payload is provided to the front-end device.

Figure 7:
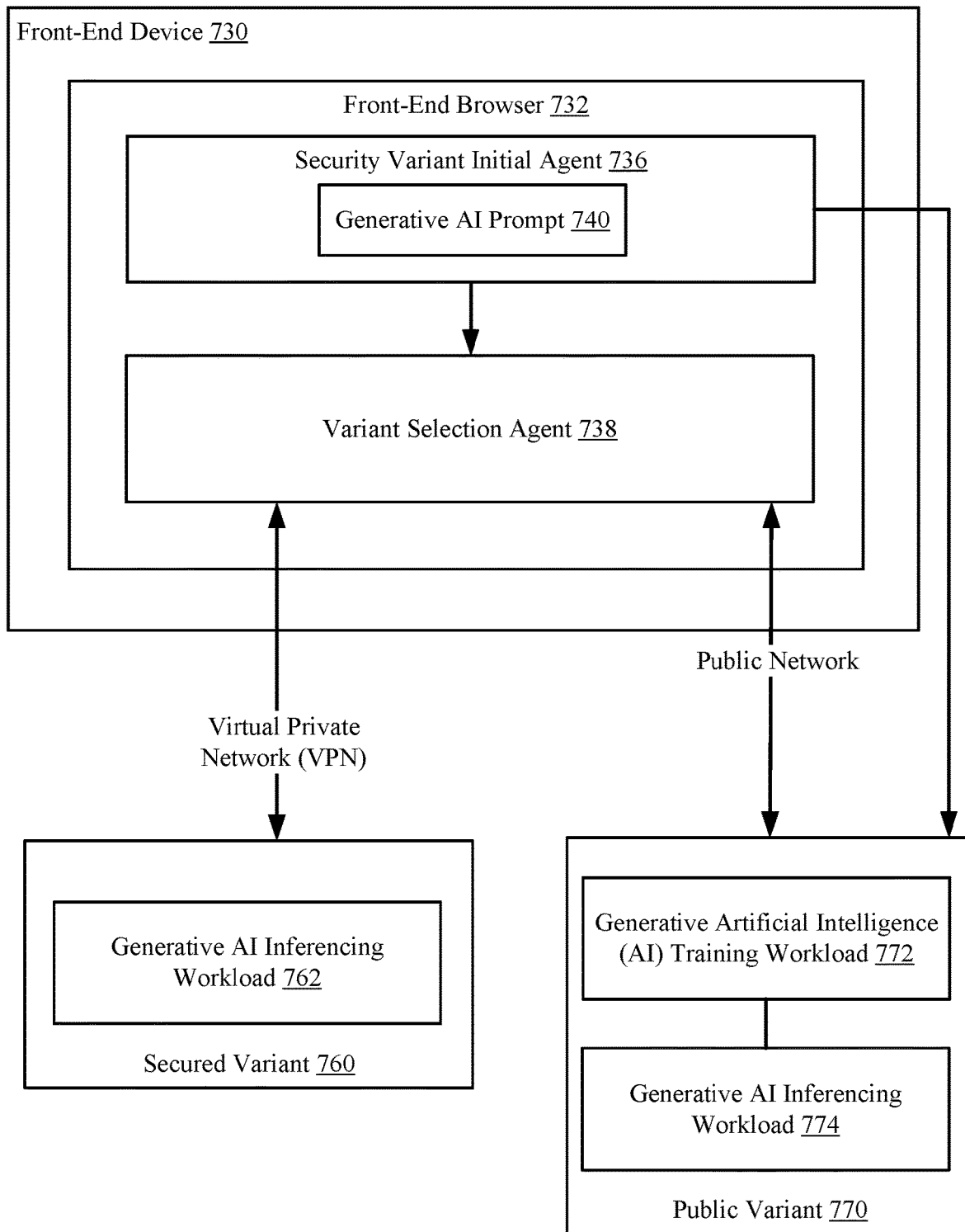
FIG. 7 shows a diagram of a third example system in accordance with one or more embodiments of the invention.

To further clarify embodiments of the invention described in, at least, FIGS. 2.3 and 6, a third non-limiting example is provided in FIG. 7. For the sake of brevity, only a limited number of components of the example system of FIGS. 1.1-1.3 are illustrated in FIG. 7.

Example 3

Consider a scenario in which a workload placement service determines a variant to service requests for inferencing payloads. The requests may specify an AI model that is a generative language model that generates text based on a text input prompt. The AI model may be re-trained using new training data set based on previous prompts and previously-generated inferencing payloads.

Turning to FIG. 7, FIG. 7 shows a diagram of a third example system. The third example system includes a front-end device (730) that executes an internet browser (also referred to as a front-end browser (732)). The front-end browser (732) includes a security variant initial agent (736) that enforces the security based allocation in accordance with FIG. 6. For a generative AI prompt (740) that is classification-eligible, the security variant initial agent (736) sends the generative AI prompt (740) to be processed by a variant selection agent (738). For a generative AI prompt (740) that is not classification-eligible, the security variant initial agent (736) bypasses the processing by the variant selection agent (738) and sends the generative AI prompt (740) to be processed by a public variant (770).

In this example, the front-end device (730) implements the variant selection agent (738). For the generative AI prompts (e.g., 740) that are classification-eligible, the variant selection agent (738) performs the method of FIG. 2.3 to determine a variant to service the generative AI prompt (740). In this example, the variant selection agent (738) accesses a secured variant (760) using a VPN and accesses the public variant (770) using a public network.

After processing the request in accordance with FIG. 2.3, the variant selection agent (738) sends the request to the selected variant (760, 770). For requests selected to be processed by the secured variant (760), a generative AI inferencing workload (762) implemented by the secured variant (760) is used to generate the inferencing payload and transmitted to the variant selection agent (738) via the VPN. For requests selected to be processed by the public variant (770), a generative AI inferencing workload (774) implemented by the public variant (770) is used to generate the inferencing payload and transmitted to the variant selection agent (738) via the public network. Further, in contrast to the generative AI inferencing workload (762) of the secured variant (760), the generative AI workload (762) of the public variant (770) may further use the information included in the generative AI prompt (740) and the generated inferencing payload to re-train the generative AI model. A generative AI training workload (772) executes in the public variant (770) for the purposes of the retraining.

End of Example 3

As discussed above, embodiments of the invention may be implemented using computing devices. FIG. 8 shows a diagram of a computing device in accordance with one or more embodiments of the invention. The computing device (800) may include one or more computer processors (802), non-persistent storage (804) (e.g., volatile memory, such as random access memory (RAM), cache memory), persistent storage (806) (e.g., a hard disk, an optical drive such as a compact disk (CD) drive or digital versatile disk (DVD) drive, a flash memory, etc.), a communication interface (812) (e.g., Bluetooth interface, infrared interface, network interface, optical interface, etc.), input devices (810), output devices (808), and numerous other elements (not shown) and functionalities. Each of these components is described below.

In one embodiment of the invention, the computer processor(s) (802) may be an integrated circuit for processing instructions. For example, the computer processor(s) may be one or more cores or micro-cores of a processor. The computing device (800) may also include one or more input devices (810), such as a touchscreen, keyboard, mouse, microphone, touchpad, electronic pen, or any other type of input device. Further, the communication interface (812) may include an integrated circuit for connecting the computing device (800) to a network (not shown) (e.g., a local area network (LAN), a wide area network (WAN) such as the Internet, mobile network, or any other type of network) and/or to another device, such as another computing device.

In one embodiment of the invention, the computing device (800) may include one or more output devices (808), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (802), non-persistent storage (804), and persistent storage (806). Many different types of computing devices exist, and the aforementioned input and output device(s) may take other forms.

Embodiments of the invention may provide a system and method for providing AI workload placement services for a system that includes multiple production environments such as computing devices with varying hardware configurations and varying levels of computing resources. Embodiments disclosed herein provide methods for determining (e.g., selecting) a production environment to service the AI workloads based on a set of factors. One of the set of factors may include latency minimization and/or completion time minimization. Determining the production environment based on latency minimization provides an improved user experience by improving the speed in which requests for inferencing payloads are provided. Further, determining a production environment based on completion time minimization improves the user experience by reducing the time taken to train or modify AI models and deploy the trained AI models at a faster rate within the constraints of the available production environments. By improving the experience of the user, embodiments disclosed herein improve the overall efficiency of the use of the system.

Another of the set of factors may include security considerations. Embodiments disclosed herein may assign the servicing of requests for inferencing payloads based on a level of sensitivity of the information included in the requests. By dynamically selecting a variant to service each request, embodiments leverage the optimal parameters of the inferencing workloads. For example, requests that include highly sensitive information may be assigned to inferencing workloads of secured variants that prioritize the privacy of the information in the requests. In contrast, requests that do not include such highly sensitive information may be serviced in public variants that prioritize the performance of the inferencing workload to generate the inferencing payloads.

Thus, embodiments of the invention may address the problem of limited computing resources in a distributed system. The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing workload placement, the method comprising:
   obtaining, by a variant selection agent of a workload placement service and from a front-end device, a request for an inferencing payload generated by an inferencing workload and wherein the request includes sensitive information;
   in response to the request:
      performing a payload classification on the request to determine a variant selection for the inferencing workload, wherein the variant selection is one selected from the group consisting of a secured variant and a public variant and based on the inclusion of the sensitive information in the request;
      selecting, based on the payload classification, the secure variant as the variant selection;
      in response to the selection, transmitting the request to the secured variant, wherein the secured variant executes an instance of the inferencing workload on a secured production environment;
      obtaining, from the secured variant, the requested inferencing payload, wherein the requested inferencing payload is generated by the secured variant executing a generative artificial intelligence (AI) model; and
      providing, after the obtaining, the requested inferencing payload to the front-end device.

2. The method of claim 1, further comprising:
   obtaining, by the variant selection agent and from the front-end device, a second request for a second inferencing payload associated with the inferencing workload;
   in response to the request:
      performing a second payload classification on the inferencing payload to determine a second variant selection for the inferencing workload;
      selecting, based on the second payload classification, the public variant as the second variant selection;
      in response to the second selection, transmitting the second request to the public variant,
         wherein the public variant executes a second instance of the inferencing workload on a second production environment, and
         wherein the second instance of the inferencing workload comprises using the inferencing payload for future training of the generative AI model;
      obtaining, from the public variant, the requested second inferencing payload; and
      providing the requested second inferencing payload to the front-end device.

3. The method of claim 1, wherein the selection is based on a level of sensitivity of the sensitive information in the request.

4. The method of claim 3, wherein the level of sensitivity is determined by the variant selection agent, wherein the level of sensitivity is based on whether the request comprises confidential information, and wherein the sensitive information is confidential information.

5. The method of claim 1, wherein the secured production environment is a computing device of an on-premise environment accessible via a virtual private network (VPN).

6. The method of claim 1, wherein the secured production environment is a computing device of a cloud environment operatively connected to the front-end device via a virtual private network (VPN).

7. A non-transitory computer readable medium comprising computer readable program code, which when executed by a computer processor enables the computer processor to perform a method for managing information handling systems, the method comprising:
   obtaining, by a variant selection agent of a workload placement service and from a front-end device, a request for an inferencing payload generated by an inferencing workload and wherein the request includes sensitive information;

in response to the request:
  performing a payload classification on the request to determine a variant selection for the inferencing workload, wherein the variant selection is one selected from the group consisting of a secured variant and a public variant and based on the inclusion of the sensitive information in the request;
  selecting, based on the payload classification, the secure variant as the variant selection;
  in response to the selection, transmitting the request to the secured variant, wherein the secured variant executes an instance of the inferencing workload on a secured production environment;
  obtaining, from the secured variant, the requested inferencing payload, wherein the requested inferencing payload is generated by the secured variant executing a generative artificial intelligence (AI) model; and
  providing, after the obtaining, the requested inferencing payload to the front-end device.

8. The non-transitory computer readable medium of claim 7, further comprising:
  obtaining, by the variant selection agent and from the front-end device, a second request for a second inferencing payload associated with the inferencing workload;
  in response to the request:
    performing a second payload classification on the inferencing payload to determine a second variant selection for the inferencing workload;
    selecting, based on the second payload classification, the public variant as the second variant selection;
    in response to the second selection, transmitting the second request to the public variant,
      wherein the public variant executes a second instance of the inferencing workload on a second production environment, and
      wherein the second instance of the inferencing workload comprises using the inferencing payload for future training of the generative AI model;
    obtaining, from the public variant, the requested second inferencing payload; and
    providing the requested second inferencing payload to the front-end device.

9. The non-transitory computer readable medium of claim 7, wherein the selection is based on a level of sensitivity of the sensitive information in the request.

10. The non-transitory computer readable medium of claim 9, wherein the level of sensitivity is determined by the variant selection agent, wherein the level of sensitivity is based on whether the request comprises confidential information, and wherein the sensitive information is confidential information.

11. The non-transitory computer readable medium of claim 7, wherein the secured production environment is a computing device of an on-premise environment accessible via a virtual private network (VPN).

12. The non-transitory computer readable medium of claim 7, wherein the secured production environment is a computing device of a cloud environment operatively connected to the front-end device via a virtual private network (VPN).

13. A system, comprising:
a processor; and
memory including instructions, which when executed by the processor, perform a method comprising:
  obtaining, by a variant selection agent of a workload placement service and from a front-end device, a request for an inferencing payload associated with an inferencing workload and wherein the request includes sensitive information;
  in response to the request:
    performing a payload classification on the request to determine a variant selection for the inferencing workload, wherein the variant selection is one selected from the group consisting of a secured variant and a public variant and based on the inclusion of the sensitive information in the request;
    selecting, based on the payload classification, the secure variant as the variant selection;
    in response to the selection, transmitting the request to the secured variant, wherein the secured variant executes an instance of the inferencing workload on a secured production environment;
    obtaining, from the secured variant, the requested inferencing payload, wherein the requested inferencing payload is generated by the secured variant executing a generative artificial intelligence (AI) model; and
    providing, after the obtaining, the requested inferencing payload to the front-end device.

14. The system of claim 13, further comprising:
obtaining, by the variant selection agent and from the front-end device, a second request for a second inferencing payload associated with the inferencing workload;
in response to the request:
  performing a second payload classification on the inferencing payload to determine a second variant selection for the inferencing workload;
  selecting, based on the second payload classification, the public variant as the second variant selection;
  in response to the second selection, transmitting the second request to the public variant,
    wherein the public variant executes a second instance of the inferencing workload on a second production environment, and
    wherein the second instance of the inferencing workload comprises using the inferencing payload for future training of the generative AI model;
  obtaining, from the public variant, the requested second inferencing payload; and
  providing the requested second inferencing payload to the front-end device.

15. The system of claim 13, wherein the selection is based on a level of sensitivity of the sensitive information in the request, wherein the level of sensitivity is determined by the variant selection agent, wherein the level of sensitivity is based on whether the request comprises confidential information, and wherein the sensitive information is confidential information.

16. The system of claim 13, wherein the secured production environment is a computing device of an on-premise environment accessible via a virtual private network (VPN).

17. The system of claim 13, wherein the secured production environment is a computing device of a cloud environment operatively connected to the front-end device via a virtual private network (VPN).

* * * * *